United States Patent [19]

Tsuruta et al.

[11] Patent Number: 4,926,343
[45] Date of Patent: May 15, 1990

[54] TRANSIT SCHEDULE GENERATING METHOD AND SYSTEM

[75] Inventors: Setsuo Tsuruta, Sagamihara; Shoji Miyamoto, Kawasaki, both of Japan

[73] Assignee: Hitachi, Ltd., Tokyo, Japan

[21] Appl. No.: 255,253

[22] Filed: Oct. 11, 1988

Related U.S. Application Data

[63] Continuation-in-part of Ser. No. 832,892, Feb. 26, 1986, abandoned.

[30] Foreign Application Priority Data

Feb. 28, 1985 [JP] Japan .................. 60-39869

[51] Int. Cl.⁵ .................. G06F 15/60; G06F 13/38
[52] U.S. Cl. .................. 364/513; 364/136; 364/514; 364/925.3
[58] Field of Search .............. 364/131, 132, 436, 513, 364/514, 521, 900; 368/82

[56] References Cited

U.S. PATENT DOCUMENTS

| | | | |
|---|---|---|---|
| 3,944,986 | 3/1976 | Staples | 364/900 |
| 4,122,523 | 10/1978 | Morse et al. | 364/436 |
| 4,304,001 | 12/1981 | Cope | 364/132 |
| 4,305,131 | 12/1981 | Best | 364/521 |
| 4,477,881 | 10/1984 | Kobayashi et al. | 364/900 |
| 4,485,463 | 11/1984 | Kita | 368/82 |
| 4,534,012 | 8/1985 | Yokozawa | 364/900 |
| 4,610,206 | 9/1986 | Kubala et al. | 364/131 |

FOREIGN PATENT DOCUMENTS 193207 9/1986 European Pat. Off. ............ 364/514

Primary Examiner—Felix D. Gruber
Attorney, Agent, or Firm—Antonelli, Terry, Stout & Kraus

[57] ABSTRACT

This invention relates to a method of and a system for generating and correcting or regulating a transit schedule of a transportation medium, such as a train. Schedule tables for transportation media having numerical values for departure and arrival time, place of departure, transportation media and trainmen to be allotted and connection transportation media are correspondingly shown. Diagrams of plans are edited differently from the schedule tables, and diagrams of all or individual operations to be carried out by trainmen and other workers are all stored in a memory, and these diagrams are displayed in a display unit. Whenever variations occur in the schedules and actual transit condition is checked. Problems are eliminated automatically in a predetermined range of the diagrams, or picture and guidance displayed at once.

29 Claims, 20 Drawing Sheets

FIG. 3

```
auto plan parameter menu      | replan    | vehicle | trainman | monitor | exit
departure frequency           | UNCALL AUTO-PLAN 1 menu pane
interval:300
route
from: HAKATA
via: OSAKA
to: TOKYO
exit
                                                       ~56
``` planning pane

```
              6 7 8 9 10 11 12 13 14 15 16 17 18 19 20 21 22 23
              inspection    TOKYO
V10  TOKYO                  inspection
V20  TOKYO                                  inspection
V30  TOKYO
V40  TOKYO
V50  TOKYO
V60  TOKYO
V70  TOKYO
V80        inspection
V15        inspection
V25  HAKATA                 HAKATA
V35  HAKATA                 inspection
V45  HAKATA                                 inspection
V55  HAKATA
V65  HAKATA
V75  HAKATA
V85        inspection
V100       inspection
``` vehicle allocation diagram

```
                              6 7 8 9 10 11 12 13 14 15 16 17 18 19 20 21 22 23
tokyo station
nagoya station
osaka station
hiroshima station
hakata station                6 7 8 9 10 11 12 13 14 15 16 17 18 19 20 21 22 23
``` train diagram

| H0243    en route stop time |         |
|-----------------------------|---------|
| HAKATA                      | : 1200  |
| HOROSHIMA                   | : 1330  |
| OSAKA   arrival             | : 1530  |
| OSAKA   departure           | : 1533  |
| NAGOYA                      | : 1630  |
| TOKYO                       | : 1830  |
| EXIT ☐              diagram ☐ |       |

TRANSIT SCHEDULE GENERATING METHOD AND SYSTEM

This application is a continuation-in-part of application Ser. No. 832,892, filed Feb. 26, 1986, now abandoned.

BACKGROUND OF THE INVENTION

1. Field of the Invention

This invention relates to a transit schedule generating method and system, and more particularly to a human interface system for generating and changing railway schedules and flight schedules, or automating or semi-automating the execution or the supporting of the regulation of such schedules.

2. Description of the Prior Art

As computers have been developed, the generation and regulation of railway schedules have been computerized. However, due to the limitation of the performance of the hardware and software of a computer, it is still necessary for man to share the functions of a computer and check the results of computer-processed work. In spite of this fact, a method has not sufficiently been developed, which is helpful in understanding the content of a computer-processing operation, sufficiently indicating the information, which is required for the generation and correction of a railway schedule, on a display, manually checking the results of computer-processed data and adding and incorporating the operator's judgement in the results of computer-processed data. A conventional transit schedule generating system is merely provided with a schedule-setting display and a schedule diagram-indicating display. A schedule is set by the former display and confirmed by the latter display, and this system has no greater ability. In the generation and regulation of a railway schedule, not only a schedule diagram but also a diagram of allocation of vehicles and trainmen and a diagram of the condition of use of station facilities should be displayed at once when necessary. Frequently the following two types of such diagrams should be displayed at once, i.e. general diagrams including general information and divisional diagrams including particular information. Making schedule diagrams of train and station is also important. It is necessary that these schedule diagrams be displayed as necessary in required sizes and shape in positions in which they can be seen at once.

It is unsuitable to use such a conventional transit schedule generating system for the purpose of accurately generating and changing a railway schedule while watching the schedule as a whole, by displaying the information on such a schedule with respect to the above-mentioned various subjects at once for the convenience of comparing and checking each divisional information and grasping the general information, or by transferring a part or an element of the information by an easily-operable mouse while watching the schedule diagram, or by changing the shape of an element of the information while watching the schedule diagram. As an example by a recently developed transit schedule generating system, which also uses two displays, a schedule setting picture and a picture of schedules for all trains can be displayed. However, the generation and correction of a schedule diagram are done only on the schedule setting picture, and the functions of changing a schedule by efficiently manipulating the elements of the schedule diagram are not provided. The pointing device used in this system includes a light pen of a low level of handling efficiency, and a mouse is not employed. In a system using both a key board and a light pen, inputting accurate numerical values is difficult.

(Reference literature: "DIAPS Schedule Diagram Generating System of the National Railways Corporation" (18th Collection of Drafts of Theses on the Railway Cybernetics, 1981, page 151)

SUMMARY OF THE INVENTION

An object of the present invention is to provide a transit schedule generating method and system, which is free from the above-mentioned problems in a conventional system of this kind, and which are required to carry out the generation of transit schedules and the changing of transit schedules when an accident or a delay occurs, i.e. the regulation of operation of trains, with a high efficiency and a high reliability.

To achieve this object, the present invention provides a transit schedule generating system having an information processing means and an input and output means, characterized in that the system includes a first logic acting unit for managing the transit schedule for an object to be transferred, and a second logic acting unit for managing the transit schedule for a transportation resource needed for transporting the object, each logic acting unit having active knowledge and passive knowledge, this system having a step of exchanging the information held by one logic acting unit with that held through the other by message passing, and a step for operating or modifying a schedule to be managed by itself on the basis of the exchanged information.

Wherein the term logic acting unit often personified as logic acting units performing roles name an intelligent model implemented as a program unit or a firmware unit having an active knowledge base, with related data or passive knowledge such as human attributes, knowledge or states.

In other words, a logic acting unit is a kind of an object or a frame in Artificial Intelligence modeling active like suggestions, requests and problems about schedules for the arguing or controls arguing with other logic acting units. While other objects or frames or logic acting units model passive knowledge like trainmen objects, problems etc. which are scheduled or solved by logic acting units. Logic acting units exchange information by way of message passing, or each logic acting unit is invoked by passaged messages.

BRIEF DESCRIPTION OF THE DRAWINGS

FIG. 3 shows a picture appearing at the time of setting parameters for the automatic generation of a schedule diagram;

FIG. 5 shows a picture appearing when a conflict occurs in the automatic trainman allocation;

FIGS. 7–10 show pictures in which sizes, shapes and positions are displayed in rows as necessary in the same manner as in a multiwindow;

FIG. 11 is a diagram showing the en route station stop time;

DESCRIPTION OF THE PREFERRED EMBODIMENTS

An embodiment of the present invention will now be described with reference to the drawings.

Figure 1:
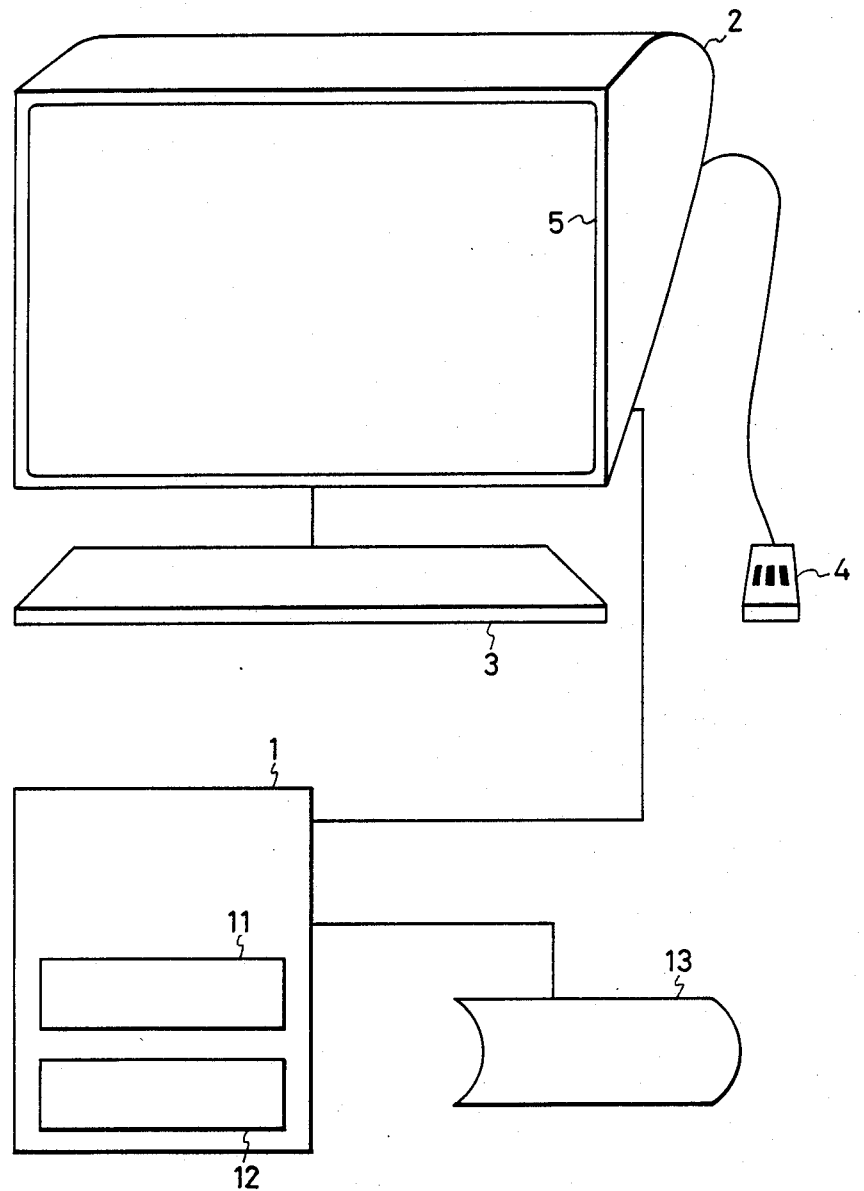
FIG. 1 is a construction diagram of an embodiment of a system 1 according to the present invention.

FIG. 1 is a general block diagram of an embodiment of a transit schedule generating, regulating and supporting apparatus as a whole according to the present invention.

Referring to FIG. 1, reference numeral 1 denotes a computer, 2 a display, 3 a key board, and 4 an input unit called a mouse.

In order to operate this apparatus, the operational procedure is stored in a firmware memory 11 in the computer 1 or loaded in a main memory 12 in the computer 1 from an auxiliary memory 13 which consists of a disc or a magnetic tape, or a part of the procedure is stored in the firmware memory 11 with the remaining part thereof loaded in the main memory 12. The apparatus is then started as the operation of the computer 1 is suitably controlled. A computer modified so that it acts in accordance with the operation of this system in this manner will hereinafter be called "system 1".

The generation and regulation of schedule diagrams is a very complicated problem requiring correct judgement concerning a large number of logic acting units, such as not only the departure and arrival time of trains and the outpacing of another train but also the vehicle and trainman dispatch, station facilities and the service given to passengers. In this system 1, such complicated problems are studied from various aspects to solve and the results including intermediate ones are expressed in various ways, i.e., by using diagrams, tables and sentences, in accordance with the information processing psychological theory. Namely, the information on the above-mentioned various logic acting units of a transit schedule is expressed by using diagrams, tables and sentences in various ways on the basis of a combination of the concept of object module, which will be described later, and the graphical techniques includes a multiwindow, and the resultant information is displayed at once as necessary in required shapes and in required positions so that the information can be checked comparatively and grasped generally with ease.

The functions of the present invention can be attained by merging the concept of using logic acting units and demons with high-degree graphical techniques on the basis of an information processing module called an object. An object consists of names of items describing the internal condition thereof, and knowledge describing a method of changing data, which constitute the internal condition of message from another object, and sending a message to another object. A logic acting unit, which is a kind of object, is similar to a logic acting unit in a motion picture and a drama, and consists of a knowledge body which is capable of making actions in accordance with its predetermined role. A user (man) is sometimes considered as this kind of a logic acting unit. The logic acting unit in the present invention is generally different from a program module in a conventional system of this kind. The logic acting unit is adapted to discuss problems with another logic acting unit and solve the same cooperatively therewith by exchanging messages with the mentioned logic acting unit by an information exchanging means, which is called message passing, and which is similar to the communication means of a man, neither through a common data area nor data base, such as a common area of FORTRAN, a working memory in a rule base and a blackboard in a cooperative rule base. The important data are managed as the internal condition of the logic acting unit. Since the content of the data cannot be changed by any means of the message passing, the access of data is checked always by the knowledge carrying logic acting unit. Therefore, this system enables the intelligent and highly-reliable information processing, while a conventional system using a data base couldn't. Moreover, owing to the message passing, discussion can be made not only among logic acting units but also between a logic acting unit and a man equivalently using the same communication means. Especially, between a man and a logic acting unit, a logic acting unit and a window can have one-to-one conversion through an intuitive interface, such as a multiwindow and a pointing device called a mouse. Accordingly, unlike a conventional system, in which a computer, especially, a program therefore consists of a black box, the operation of the system can be grasped through values of the internal condition of data in each logic acting unit and through message passing between the logic acting units and between a man and a logic acting unit. Therefore, the performance of the system for a man machine interaction can be improved.

Figure 12:
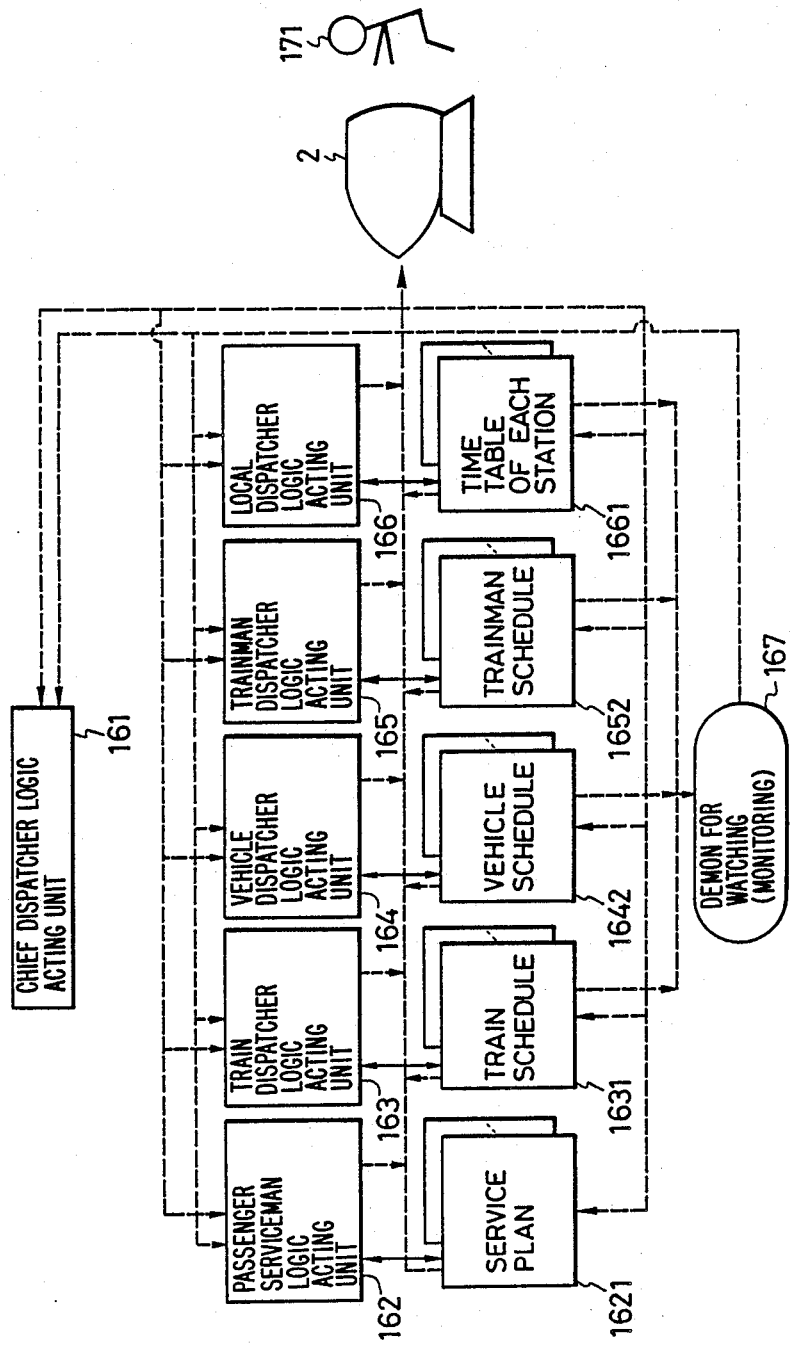
FIG. 12 and 13 are block diagrams showing the functions of the present invention.

FIG. 12 shows the construction of the functional parts and the flow of information between the functional parts in this system.

A chief - dispatcher object 161, which includes an logic acting unit corresponding to a commander-in-chief, regulates the problems between dispatcher logic acting units. The object 161 checks the possibility of re-trial for automatic correction and sets the trial conditions. The object 161 also has the functions of an intelligent interface, in which the reasoning and processing are done, which are required for the meta-level control, in which the reasoning for these checking and setting operations and a basic control operation like a control operation carried out by an operating system is done; the displaying of information with the priority order of the logic acting units and objects taken into consideration, and the shifting of an automatic operation to a manual operation, and vice versa; and the setting of the content of a menu for guiding the user.

The logic acting units corresponding to commanders in charge include objects, such as a passenger commander 162, a train dispatcher 163, a vehicle dispatcher 164, a trainman dispatcher 165, and a station manager 166. Among them the vehicle dispatcher 164 and trainman dispatcher 165 inherit their shared knowledge, that is, knowledge of resource scheduler.

The logic acting units like dispatcher logic acting units have active knowledge including rules, scripts and procedures, and passive knowledge processed thereby. Concrete examples of such knowledge are the service plan and various diagrams designated by reference numerals 1621-1661.

If these logic acting units are copied, or if a part of the knowledge therein is replaced, for example, even a train commander can easily make logic acting units of different personalities. Accordingly, a system having an individuality, especially, a system matching the individuality of a user, having excellent man-machine characteristics and different from a conventional system of this kind can be obtained.

A demon 167 as a monitor or coordinator assistant monitors the passive knowledge (this also constitutes objects, and the logic acting unit and these objects consist of modeled knowledge structures called "frames" which are accepted widely in the learned circle of psychology).

A demon is a kind of a logic acting unit and is used in an attached procedure, which is attached to each object representing a diagram (train schedule) or a resource in order to monitor the access to it.

FIG. 12 shows the flow of information among the functions (logic acting units and objects) of the present invention. In other words, FIG. 12 shows in schematic form the iteration of the functional elements of the present invention.

As already referred to in the previous paragraph and as shown in FIG. 12, the exchanging of signals between objects (including a user 171, a man, and logic acting units) is done by using messages only (message passing). The various diagrams 1631-1661 including the service plan 1621 and train dispatch schedule 1631 are changed by the dispatcher logic acting units 162-166 (for example, the service plan 1621 is changed by the passenger serviceman logic acting unit 162; the train dispatch schedule 1631 by the train dispatcher logic acting unit 163; the vehicle dispatch schedule 1642 by the vehicle dispatch logic acting unit 164; the train dispatch schedule 1652 by the trainman dispatcher logic acting unit 165; and the station schedule 1661 by the station manager local dispatcher logic acting unit 166) by which these schedules are managed, or these are changed by the user 171 who is also considered to be a kind of logic acting unit. The change of these schedules is monitored by the demon 167, and the problems are informed to the related dispatcher logic acting units so that these logic acting units check and eliminate problems. The chief dispatcher 161 coordinates if the problems are hard to fix, as will be described relative to FIG. 17. The user 171 can also send a message to each logic acting unit through the display window corresponding to the logic acting unit.

On detecting a problem, each logic acting unit indicates it on the display 2 by popping up its own window. This corresponds to a person who attends a meeting and goes in front of a blackboard to express his question or opinion. In the case when a plurality of logic acting units have problems and a meeting does not end within specified conditions, the chief dispatcher 161 controls communications among the logic acting units. This is similar to a chairman's action of controlling a meeting. The user 171 can intervene in a problem-solving process of logic acting units even in the midst of an automatic mode to communicate with each logic acting unit and object by message passing. The problems are thus solved cooperatively through communication among the logic acting units including the user 171.

Figure 13:
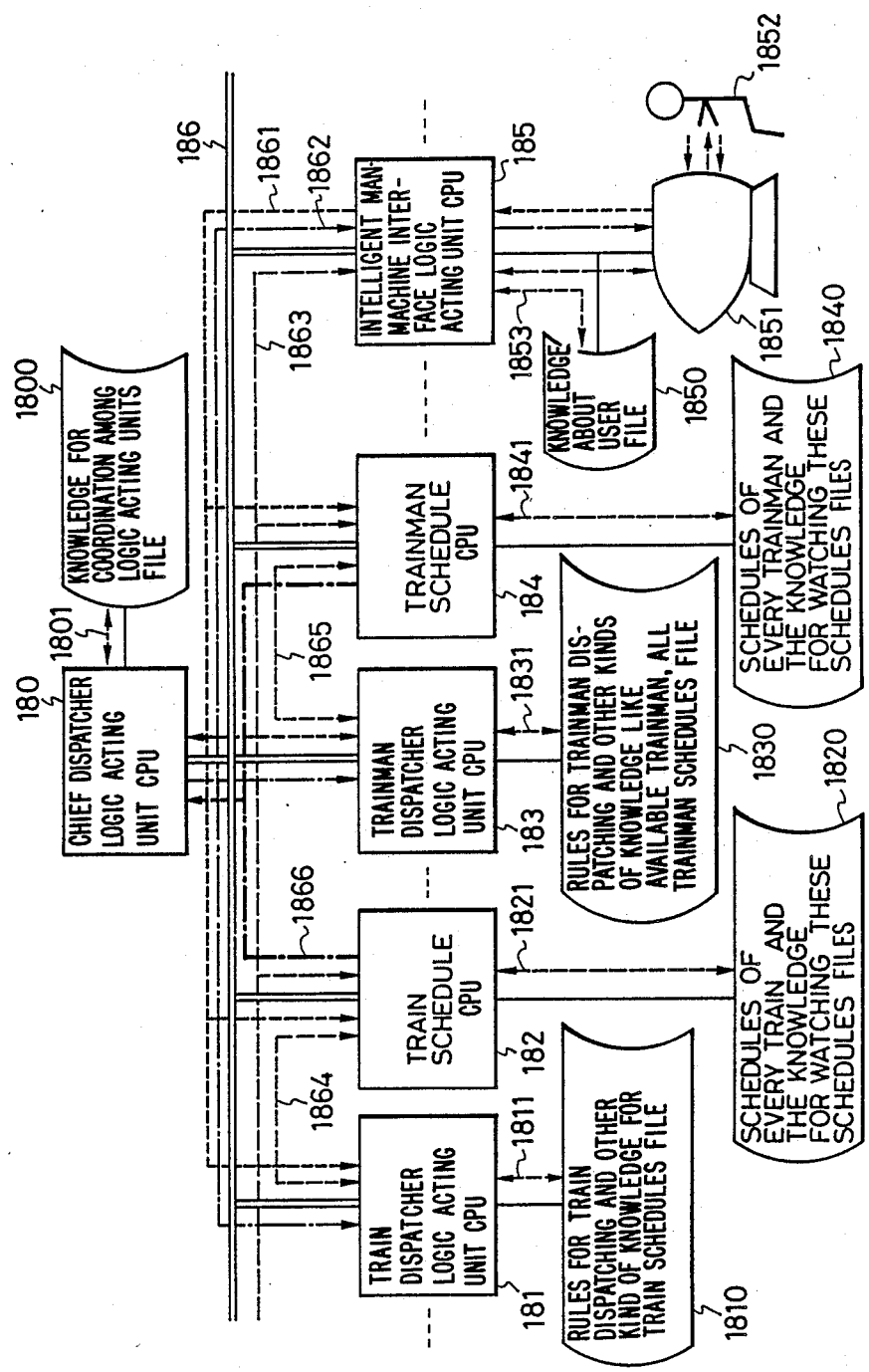

FIG. 13 shows a schematic diagram of the hardware and firmware elements of an embodiment of the present invention.

Each dispatcher logic acting unit as shown in FIG. 13, is considered to be an active object and an independent intellectual body, and are each realized by a microcomputer, a computer or LSI circuit. The logic acting units are connected together by a local network 186 consisting of buses or rings. A user interface logic acting unit 185, which has knowledge 1850 concerning the user, and which plays a role of interface with respect to the user. Schedule objects as shown in FIG. 13 are realized by microcomputers and connected to the local network 186.

The knowledge and data which may be stored in memory are owned and managed by the logic acting units and objects and are connected locally to computers corresponding thereto. The knowledge and data elements are connected to the local network 186, and cannot be accessed unless checked and permitted by an intellectual body, such as an object or a logic acting unit. This enables the generation of a transit schedule or the processing of information regarding the regulation of a transit schedule to be carried out intellectually with high reliability.

The concrete example will be described with reference to FIG. 13.

Reference numeral 181 denotes a microcomputer programmed to operate to act as a train dispatcher logic acting unit by using the train service necessary for the train schedule and stored in a local file 1810, and 182 a microcomputer to act as a train schedule object having the schedule of individual train stored in a local file 1820 and the monitoring knowledge therefor. Owing to the monitoring knowledge, the accessing of the train schedule can be done limitedly by a train dispatcher logic acting unit and a user 1852, i.e., the accessing of the train schedule can be localized.

The same applies to the other dispatcher logic acting units. For example, reference numeral 183 denotes a microcomputer programmed to operate as a trainman dispatch logic acting unit by using the trainman dispatch rules, trainman resource and the knowledge of trainman schedule as a whole, all of which are stored in a local file 1830.

Reference numeral 180 denotes a microcomputer, which has in a local file 1800 the knowledge for automatic coordination among dispatchers, logic acting units and the meta-knowledge for managing the construction or condition of logic acting units and objects and what are required thereby, and which is programmed to act as a chief dispatcher logic acting unit by which the coordination among the dispatcher logic acting units and the management of the system as a whole are done by utilizing the meta-knowledge mentioned above.

Finally, reference numeral 185 denotes a microcomputer, which has the knowledge concerning the particular user in a local file 1850, and which is programmed to operate as an intellectual interface logic acting unit, which provides the user 1852 with interactive facilities suitable for the particular user, by using a display 1851 and the above mentioned knowledge concerning the particular user.

The inputting and outputting of data and messages into and from the microcomputers and into files by the user will now be described.

Between the microcomputers, which operate as intellectual bodies, like logic acting units, communications are done necessarily by message passing, where only the messages that are checked and permitted by an object or a logic acting unit are exchanged or accessed, realizing a reliable communication means. Namely, the exchanging of information is done by message passing on the double line shown in FIG. 13.

The communication 1801, 1811, 1821, 1831, 1841, 1853 between the corresponding pairs of the computers 180–185 and their local files 1800, 1810, 1820, 1830, 1840, 1850 is local communication regarding the reading and writing of local knowledge and local data.

A thick broken line 1861 shows a flow of a command message which is used by the user to control each logic acting unit and object, and thereby check and change its local knowledge.

The thin broken lines 1863, 1864, 1865 show the flow of messages for reading and changing various schedules. As previously mentioned, the train schedule and trainman schedule are checked so that they can be accessed only by the train dispatcher logic acting unit and trainman dispatcher logic acting unit, respectively. With the exception that the user 1852 can access any of the schedules 1820, through line 1863, though checked and limited by its intelligent body 182, controlling said 1820.

A one-dot chain line 1862 shows a message sent from the chief dispatcher logic acting unit 180 for controlling each dispatcher logic acting unit.

A thick one-dot chain line 1866 shows a message for monitoring the access of various schedules like 1820, 1840 (this operation corresponds to that of the monitor-regulator demon shown in FIG. 12) and reporting the results.

This embodiment is a distributed intelligent system the reliability of which is increased greatly by a message passing mechanism. This system can be expanded gradually by adding microcomputers thereto, and the reliability of the system can be further increased by multiplying the pairs of logic acting units and objects and their local files. If the pairs of microcomputers (182, 184), which correspond to various schedule objects, and their local files 1820, 1840 are connected not to the common local network 186 but respectively and directly connective to the computers 181, for 182, 1820 183 for 184, 1840 corresponding to the dispatcher logic acting unit managing the schedules thereof, the reliability of the system can also be increased owing to an increase in both efficiency and localization of communications.

The internal structure of elements in FIG. 13 such as 181 and 180 is explained in more detail in FIG. 17 and FIGS. 18–20.

Figure 17:
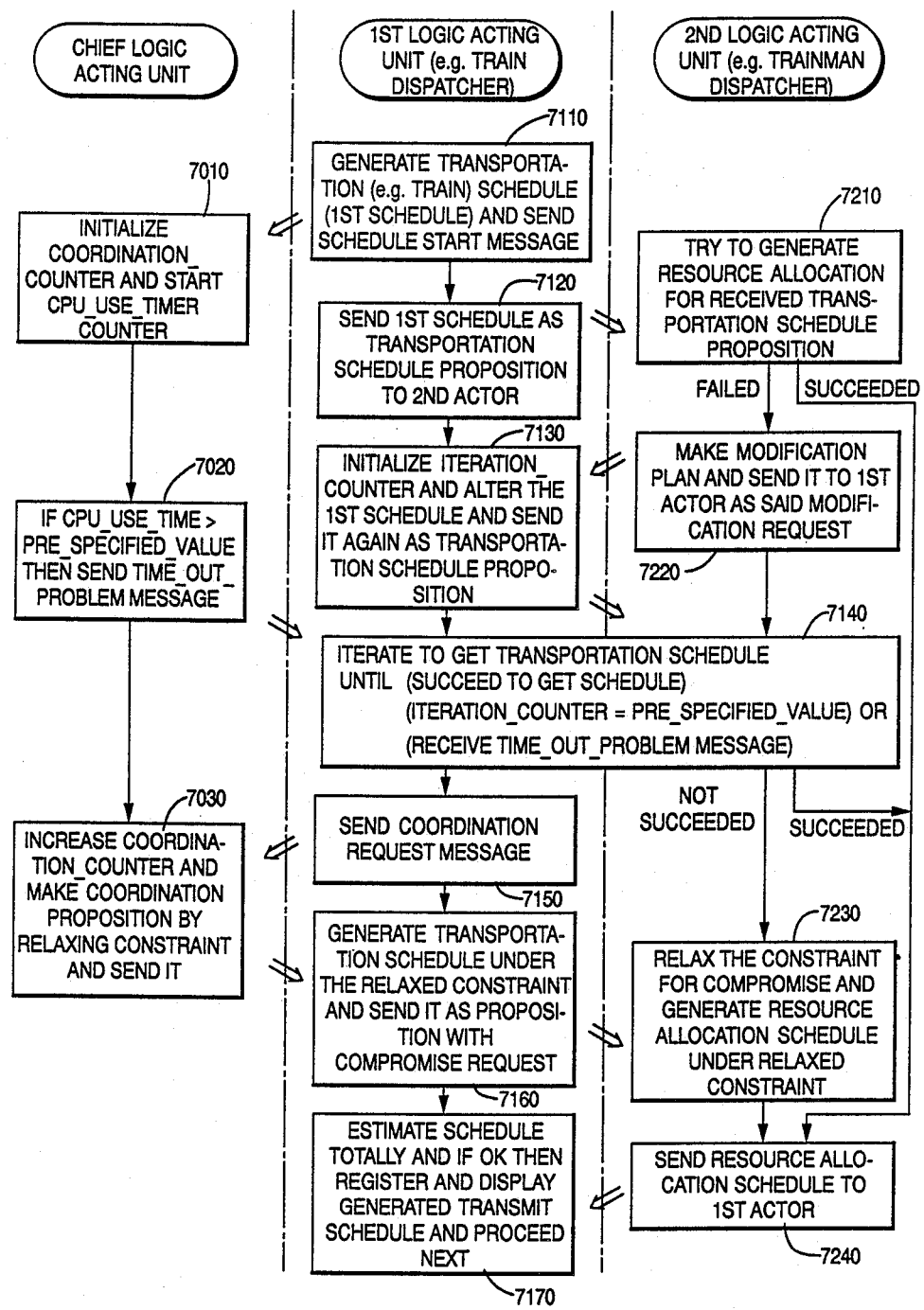
FIGS. 17-20 are flow charts showing the operation of the logic acting units.

As shown in FIG. 17, first logic acting unit (e.g. TRAIN DISPATCHER LOGIC ACTING UNIT 181 in FIG. 13) generates a transportation (e.g. train) schedule, sends a schedule start message to chief dispatcher logic acting unit (block 7110) and sends the generated schedule to second logic acting unit (7120). The chief logic acting unit initializes counters (7010). The second logic acting unit attempts to generate a resource (trainman) schedule for the above transportation (train) schedule proposition (block 7210). If the second succeeds in resource scheduling, then the generated resource schedule is sent to the first logic acting unit (block 7240). Otherwise, the second logic acting unit makes a modification request and sends it to the first logic acting unit (block 7220). The first logic acting unit initializes an iteration counter to 1 for controlling negotiation and start negotiation with the second logic acting unit. Negotiation is executed as follows. The modification request from the other logic acting unit is checked. If no problem is detected, the schedule is modified and the logic acting units succeed in getting schedules. Otherwise, alternatives such as train-departure-time or train-stop-time within the pre-specified allowable range is generated and sent as an alternative first schedule proposition to the second logic acting unit (block 7130). The negotiation process is iterated, increasing iteration-counter, until (1) all logic acting units succeed in generating schedules, (2) iteration-counter reached prespecified-value, and (3) first logic acting unit receives time-out-problem (block 7140). In case of (2) or (3), the first logic acting unit sends a coordination request message to chief logic acting unit (block 7150). The chief logic acting unit increases a coordination-counter by 1 and makes a coordination proposition by relaxing the constraint, of the allowable range and sends it to the first logic acting unit (block 7030). The first logic acting unit and the second logic acting unit restarts the negotiation process under the compromise request with a relaxed constraint proposed by the chief logic acting unit (block 7160, 7230), until getting a satisfied transportation schedule or until failure of coordination when both iteration and coordination counters reach pre-specified values.

Figure 18:
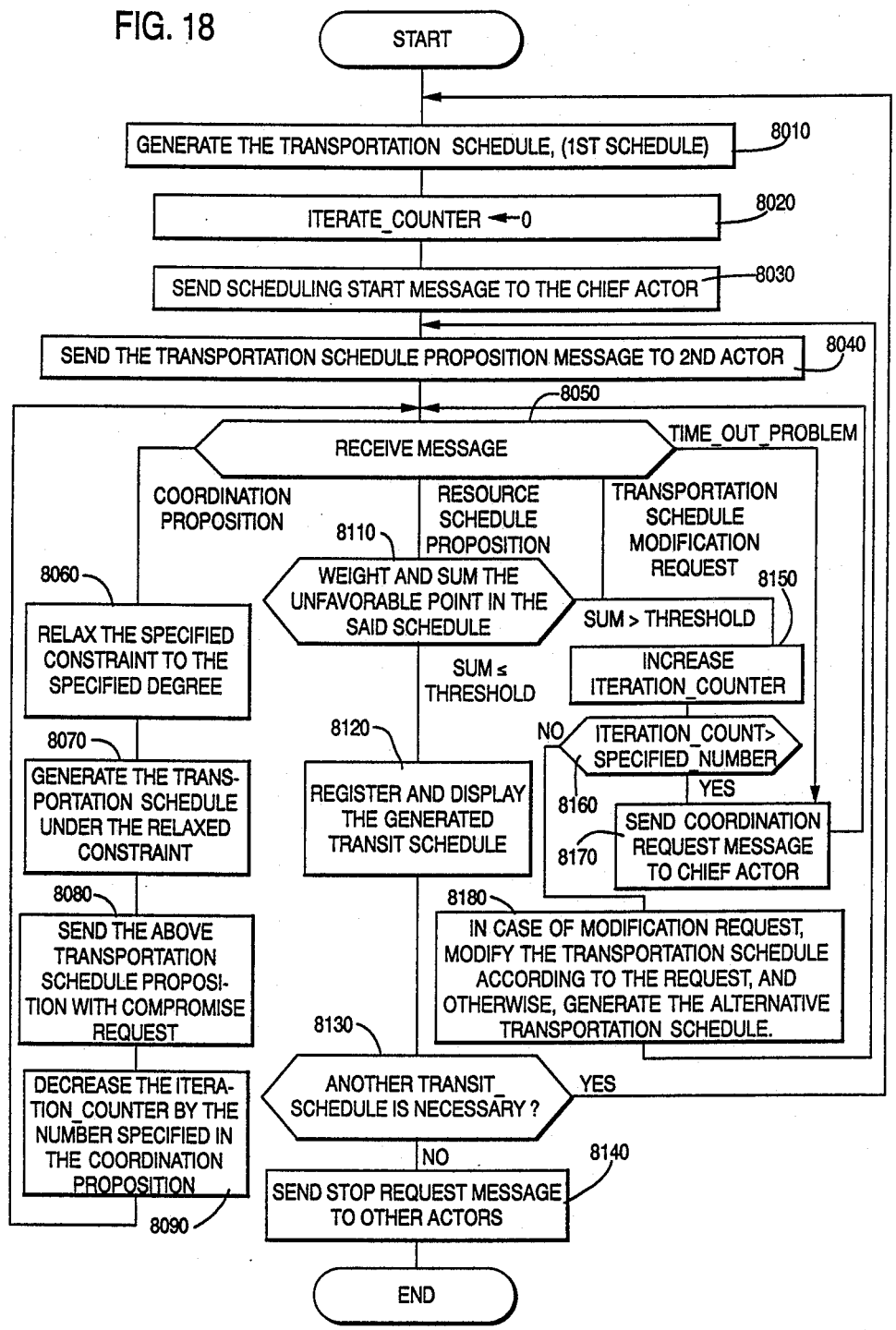
Figure 19:
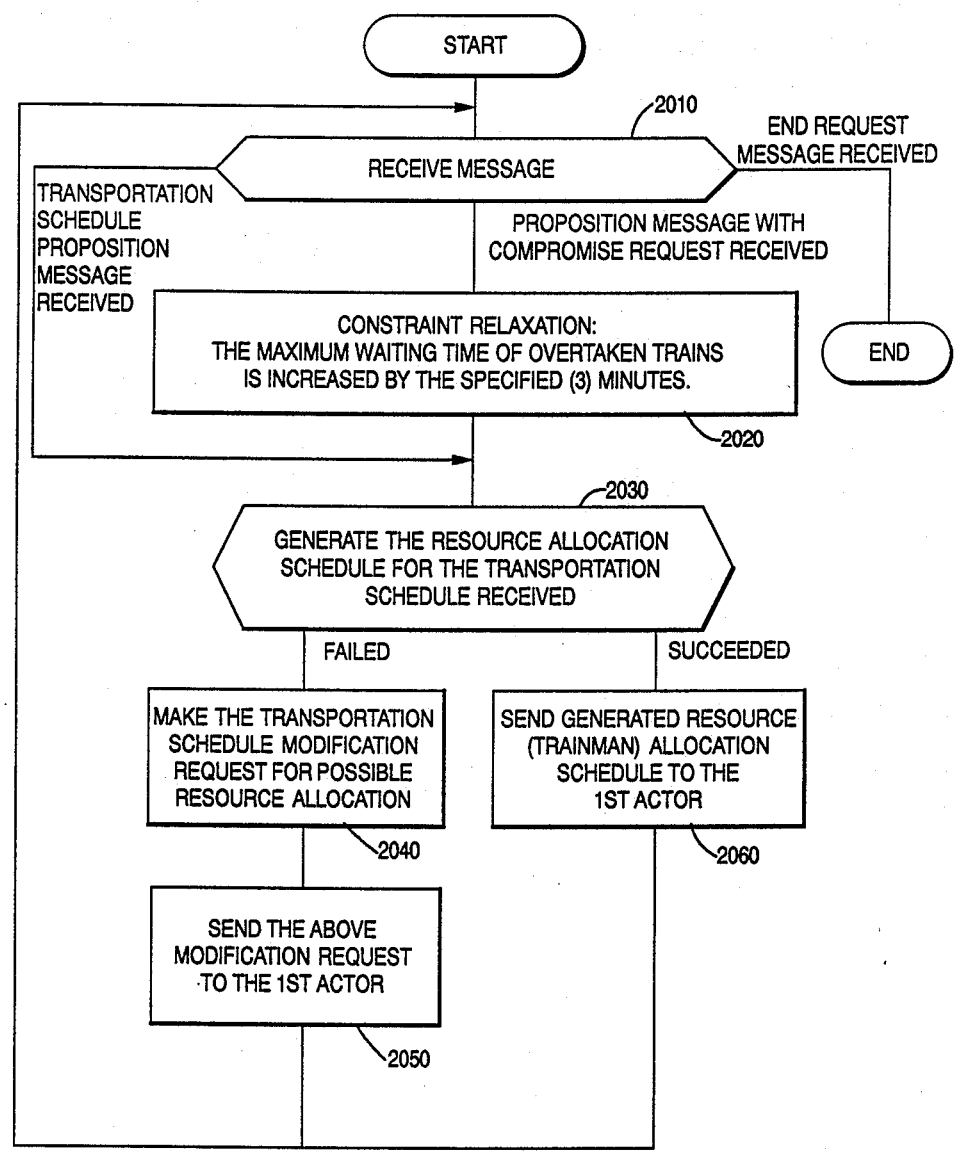
Figure 20:
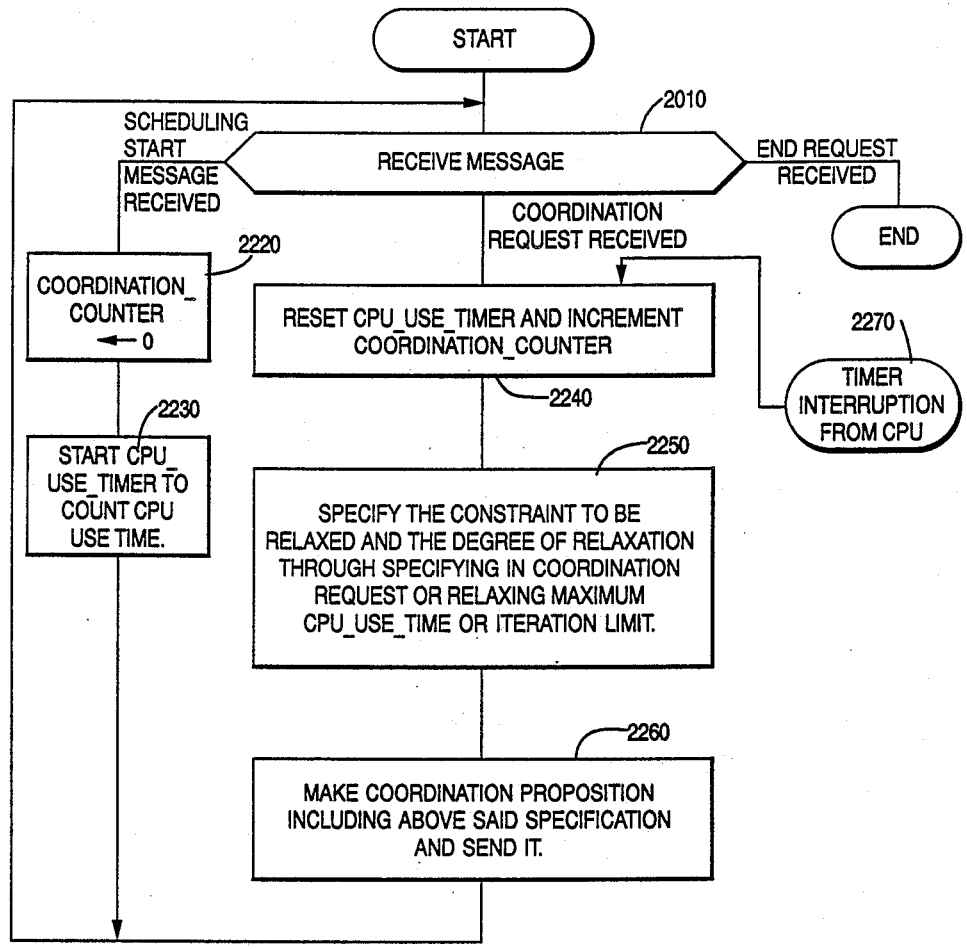

The above referenced programs to realize cooperative intelligent bodies, that is, first, second and chief logic acting unit, are described in more detail by FIGS. 18–20.

The flowcharts described in FIGS. 18–20 are those of the programs to be embodied in the firmware which operate as the first, second and third logic acting unit respectively, as follows.

FIG. 18 is the flowchart of the program for the first logic acting unit 181 TRAIN DISPATCHER Logic acting unit in FIG. 13.

As is shown in FIG. 18, first logic acting unit generates the transportation schedule when a passenger service request, business policy and physical constraints such as headway, departure-track, business-hour and train-runtime is given (block 8010). After sending the generated transportation schedule proposition message or the scheduling start message (block 8030, 8040), the first logic acting unit waits for receiving messages (block 8050). When the first logic acting unit receives a message, the following process is executed by the first logic acting unit, depending on the contents of the received messages.

(1) In case of resource schedule proposition messages both the first schedule and resource schedule are estimated (block 8110). If the estimation is OK, the generated transit schedule is registered (block 8120).

(2) In case of transportation schedule modification request message the iteration-counter is increased by 1 (block 8150). If iteration-counter reaches the specified-number (block 8160), then the modified or completely alternative transportation schedule proposition message is sent to second logic acting unit (block 8180), or a coordination request message is sent to the chief logic acting unit (block 8170).

(3) In case of time-out problem message, the coordination request message is sent (block 8170).

(4) In case of coordination proposition message, the specified constraint (block 8060) is relaxed, the transportation schedule is generated under the relaxed constraint (block 8070) and is sent with a compromise request to the second logic acting unit order to restart the negotiation process under the new constraints (block 8090).

FIG. 19 is the flowchart of the program as the example of the second logic acting unit TRAINMAN DISPATCHER LOGIC ACTING UNIT 183 in FIG. 13.

FIG. 20 is the flowchart of the program for the third CHIEF DISPATCHER Logic acting unit 180 in FIG. 13.

Figure 2:
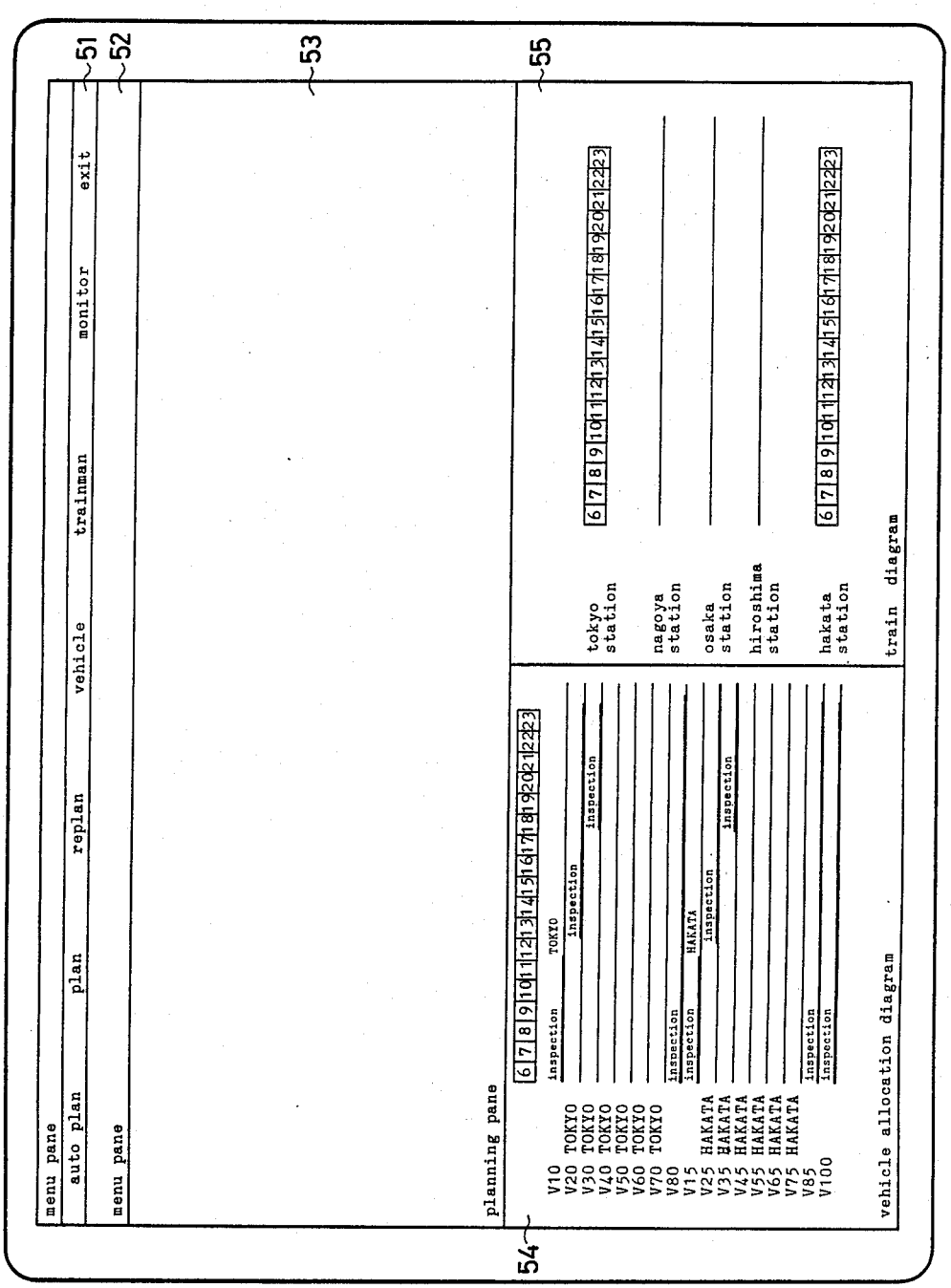
FIG. 2 shows an initial picture in the system 1 of FIG. 1.

FIG. 2 forward are pictures showing an example of a schedule change made during the generating and regulation of the schedules of trains.

FIG. 2 is an initial picture appearing on a screen 5 on a display 2 when the system 1 is started. Referring to FIG. 2, reference numeral 51 denotes a menu pane on which commands, which can be requested of the system, are indicated, 52 an input pane for indicating the commands inputted into the system and the data for monitoring the condition of a processing operation of the system, 53 a planning pane on which the schedule diagrams of trains are tabulated to be used as a train schedule table corresponding to the train schedule object 1642, 54 a window for the vehicle dispatch condition, on which the condition of allocation of all the vehicles is indicated, and 55 an all train schedule window on which the schedules of all the trains are indicated.

The window for the vehicle dispatch condition 54 is a window. In this window, a time scale graduated in hours and showing the train service time of 6:00–24:00 is indicated in the uppermost portion thereof, and the allocation schedule of all vehicles on the second line downward. At the left end portions of the second line downward, the names of vehicles are shown. The second line will be taken as an example. This line indicates that a vehicle V10 is to be subjected to inspection on from 6 to 12 o'clock and can be put to practical use as a member of a train after 12 o'clock. In this case, "TOKYO" is indicated on the part of this line of S10 which is under the hour number "12", to show that the vehicle V10 is in Tokyo at this time, and that, if this vehicle is used as a member of a train departing from Hakata or Osaka, it is necessary to send the vehicle to the mentioned station. The same applies to the line of a vehicle V20 downward. It is understood from the indications "HAKATA" in the same window 54, line 10 downward, in FIG. 2 that the vehicles S15 downward are in the yard in Hakata.

The all train schedule window 55 is a window corresponding to the train instruction logic acting unit 163, and shown the schedules of all the trains. The name of the stations, Tokyo, Nagoya, Osaka, Hiroshima and Hakata are shown vertically in the mentioned order at the left side of the window so that they are spaced from their subsequent stations in proportion to the actual distances therebetween. A lateral bar graduated in hours in the same way as in the time scale in the previously-described window of vehicles is shown at the right side of each of the letters "tokyo station" and "hakata station", and one lateral line at the right side of each of the letters of the names of the other stations.

If "auto-plan" in the menu pane 51 is selected by the mouse 4, the system 1 is operated to show an automatic schedule diagram generating precondition setting window in the picture as a multiwindow so that the window overlaps another with the necessary portion of the latter window left seen from the outside (refer to 56 in FIG. 3). Referring to FIG. 3, in this parameter window 56, which corresponds to the passenger instruction logic acting unit 162, the train departure intervals and the starting station and terminus in a travelling section are prompted by "interval" and "from" and "to", respectively, and the default values thereof are shown by the knowledge 1621 for the passenger instruction logic acting unit 162, a default value being selected, if necessary, by the mouse as in the case of "HAKATA" in the window 56, whereby a new value can be inputted form the key board 3 to enable the above-mentioned preconditions to be set easily. When the setting of the preconditions has been completed, "Exit" in the lower column is selected, so that the system 1 starts automatically the generation of schedule diagrams.

Figure 4:
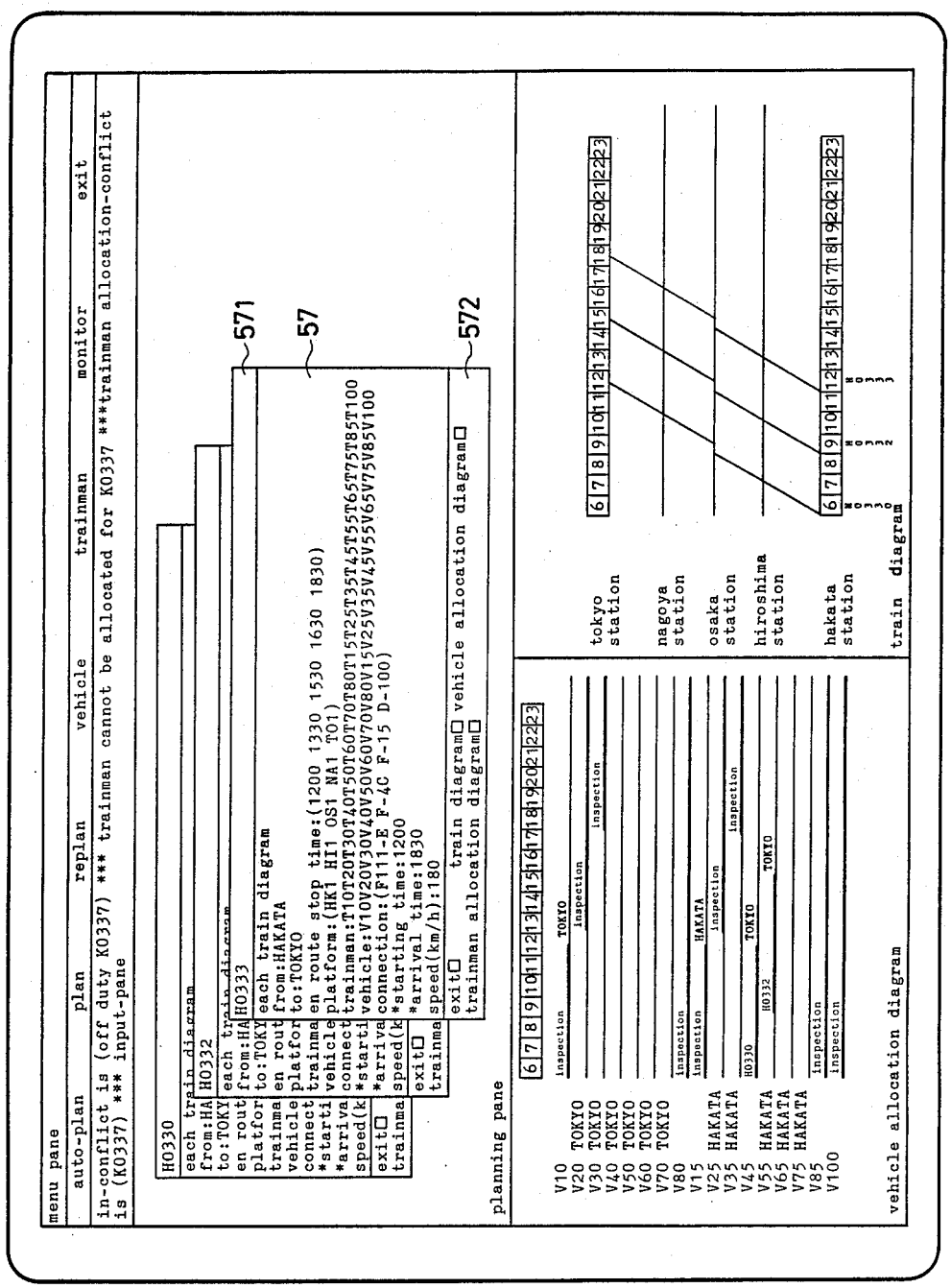
FIG. 4 shows a picture appearing during the automatic generating of a transit schedule.

FIG. 4 shows the condition of the screen 5 in the midst of the generation of schedule diagrams Reference numeral 57 denotes one of the automatically generated schedule diagrams of various trains. The uppermost portion 571 of each of the diagrams is a label of the train schedule diagram, on which a train number H0333 is indicated. For example, a train having a train number X will hereinafter be called a train X. The block below the label 571 on the train schedule diagram table 57 shows the content of the schedule of the train H0333. The indications on the second line downward on the table are divided by colons, and the part of each of these indications which is on the right side of the colon shows a value with respect to the relative item. The items in the content of the schedule diagram are the name of starting station, the name of terminus, the en route stop time, the platform for train arrival, the name of the group of trainmen in charge of operation of the train H0333, the name of vehicles allotted for the train H0333, the name of train for connection, the departure time at the starting station or the yard-leaving time, the arrival time at the terminus or the yard-leaving time, and an average travelling speed, which are indicated in the mentioned order in the downward direction. The lowermost portion 572 of the schedule table 57 is used for a control operation, and "exit" for displaying the completion of the generation of the schedule table. The other portions of this table will be described later.

In the stage shown in FIG. 4 of the generation of the schedule diagram, the vehicles and trainmen have not yet been allotted for the train H0333 but the vehicles S45, S55 have already been allotted for the trains H0330, H0332, respectively. The train schedule diagrams 57 of the trains H0330, H0332 are seen only in part, and the allocation of vehicles for these trains is not understood. However, in the vehicle dispatch window 54, the part of the lateral line for S45 which corresponds to 6–12 o'clock is thicker, and the number H0332 of the train for which the vehicle S45 has been allotted is indicated on this portion of the lateral line. It can thereby be ascertained that the vehicle S45 has been allotted for H0330. Similarly, the window 54 indicates that the vehicle S55 has also been allotted for the train H0332. Behind these thicker lateral lines, "TOKYO" is shown to indicate that the vehicles has been transferred from Hakata to Tokyo.

The train schedule diagrams of the trains H0330, H0332, H0333 are shown in the train schedule diagram window 55.

When a fact that a trainman allotted to a train K0337 is not in accordance with the regulations or does not satisfy the working conditions has been detected while a train schedule diagram is automatically generated, the system 1 outputs reasons why the trainman is problematical on a line immediately under the label on the schedule diagram 57 of the train K0337, and a correcting prompt on the following line, representing the light and shade in reverse, i.e., highlighting what are to be indicated, in both cases. The trainman instruction logic acting unit 165 places a trainman allocation window 58, on which the working plan of all the trainmen is drawn, to which window the logic acting unit 165 corresponds, on other windows, such as the vehicle allocation window 54 and all train schedule diagram window 55 to thereby indicate the window 58 on the screen. The window 58 is indicated in such sizes and in such a position that can prevent the window from overlapping the important portions of the schedule table and diagram of the train K0337 in question. In the trainman allocation window 58, the train K0337 in question is also indicated in a shaded box, i.e. what are to be indicated are accentuated (refer to FIG. 5). The train schedule table 57, vehicle allocation window 54, all train schedule window 55 and trainman allocation window 58 are moved to suitable positions (refer to FIG. 6) and the sizes and shapes thereof are changed, in accordance with the user's instructions so as to enable the required diagrams to be compared with each other easily.

These processing operations will now be described on the basis of an example in which the problems are solved by the cooperation of the logic acting units.

Figure 14:
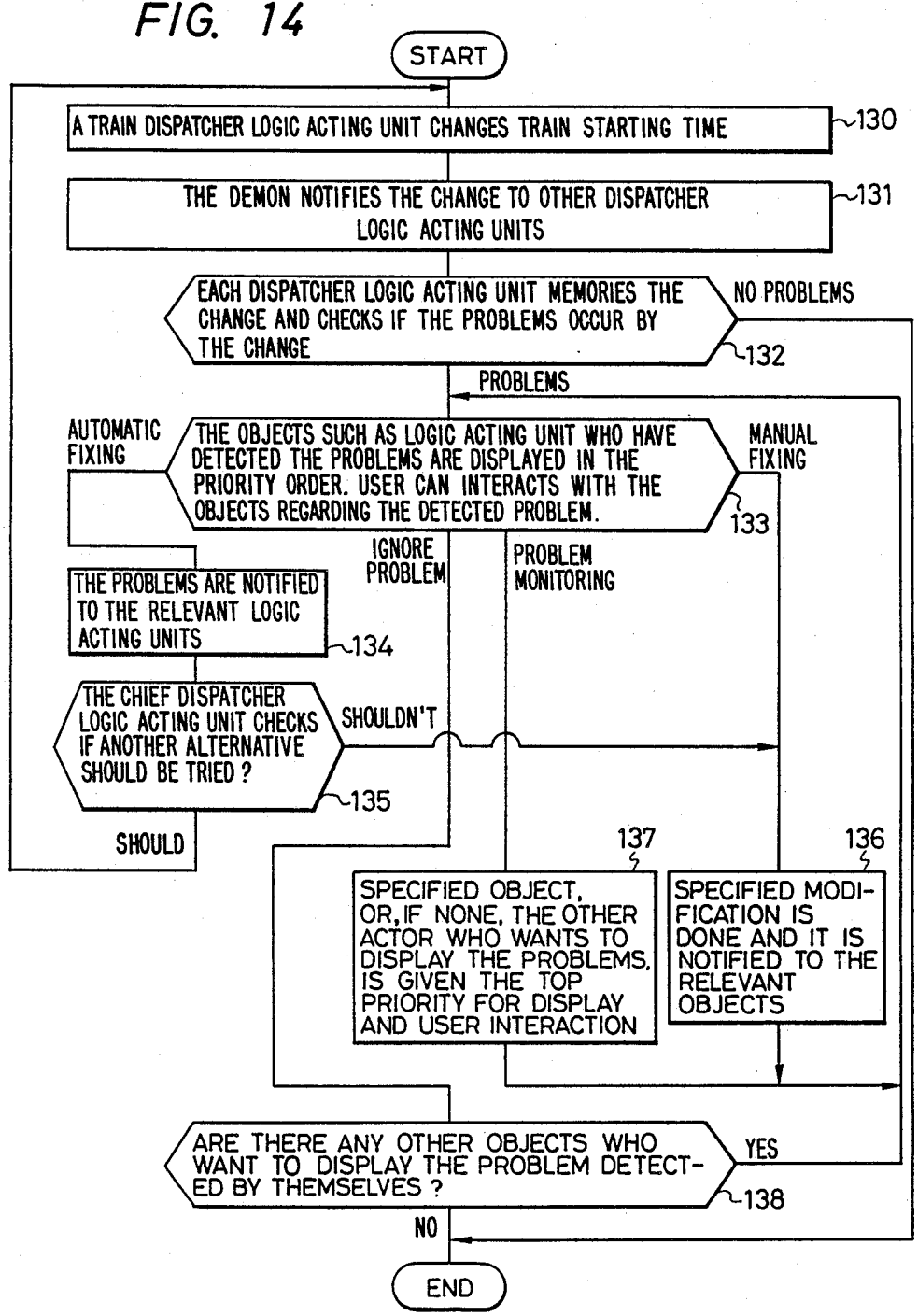
FIGS. 14-16 are flow charts showing the operation of the present invention.

The control flow of FIG. 14 for solving problems cooperatively through discussions among the logic acting units will now be described.

When a schedule (for example, departure time) is changed (block 130) by an instruction logic acting unit (for example, train instruction logic acting unit), a monitor-regulating object called a demon, which has already been referred to in the previous paragraph detects the change of the schedule to inform the fact of the other logic acting units (block 131). The instruction logic acting units which received the information on the change of schedule memorize the fact as necessary to check the same as to whether there are any problems (block 132). The instruction logic acting unit (for example, the trainman instruction logic acting unit) which has detected problems displays them on the screen according to the priority order to inform the same of the user (man) (block 133). In a manual correction mode, the problems wait the user's manual correction. When a manual correction request is made, correction is made in accordance with a manual correction operation. This correction is reported (block 136) to the relative object by the demon. If a monitoring request is made, a designated object and other instruction logic acting unit which has detected a problem are determined as the priority objects to be displayed (block 137), and these objects are displayed in the block 133. When the user ignores the problems detected and displayed by the logic acting unit in block 133, a search is conducted (block 138 to find any object which request the problems to be displayed, such as an logic acting unit which has detected different problems. If there is such an object, the operation is returned to the block 133, and, if there is not, the operation is completed.

In an automatic correction mode, or, when the user designates automatic correction, the logic acting unit which has detected a problem reports (block 134) the problem to the relative logic acting unit. The collective instruction logic acting unit checks the matter as to whether a re-trial and re-regulation should be done automatically. If the automatic correction can be done, the re-trial conditions are determined, and the operation is returned to the block 130 If the automatic correction cannot be done, the processing in the block 136 is done (block 135).

Figure 15:
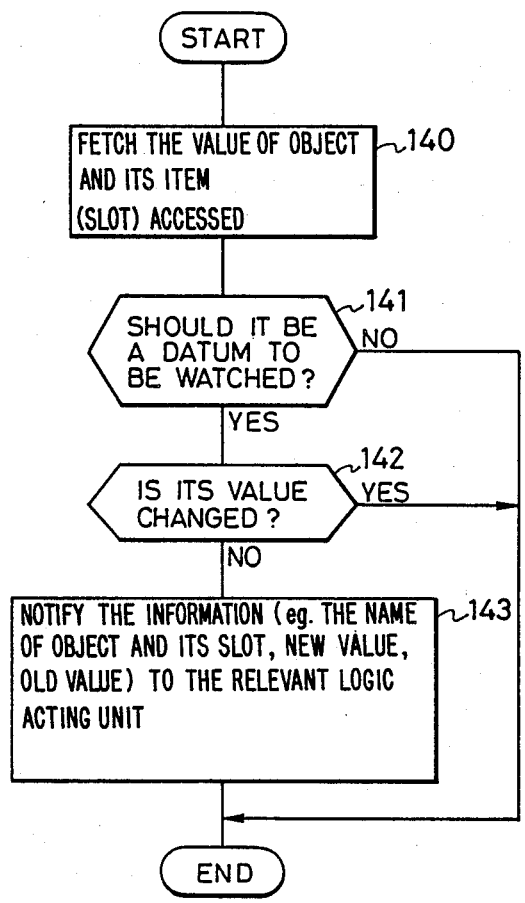

FIG. 15 is a flow chart showing the operation of the matching and coordination demon.

First, an accessed object and a pair of data items thereof are taken out (block 140). These pairs of data items are checked (block 141) as to whether the accessed data are the data to be monitored. If the accessed data are the data to be monitored, the values thereof are compared with the old values (block 142). If the values are different, the above-mentioned pairs of data items, old values and new values with respect to the accessed data are informed to the relevant instruction logic acting unit.

Figure 9:
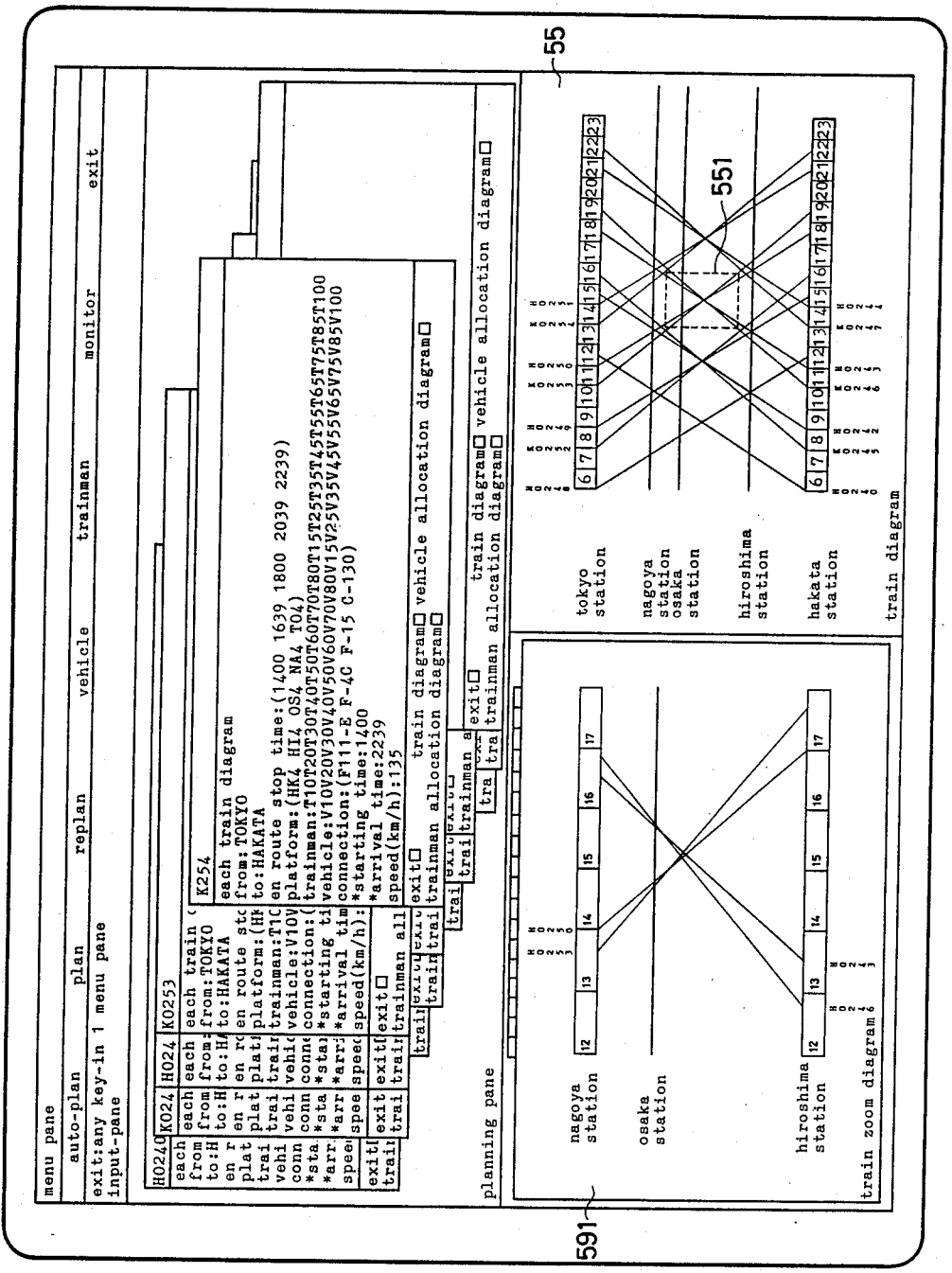

When it is necessary to expand a part of the all train schedule window 55, the pointer of the mouse is moved to the position near the portion to be expanded of the window as shown in FIG. 9. The portion of the window which is around the pointer is then marked with a rectangular frame 551. The button on the mouse is then pressed, so that a message for requesting the displaying of an expanded window is sent to a train instruction logic acting unit which corresponds to the all train schedule window 55. As a result, the enlarged diagrams (refer to a zoom window 591 in FIG. 9) of the portion in the vicinity of the marked portion are displayed in rows by the all train instruction logic acting unit 163.

Figure 10:
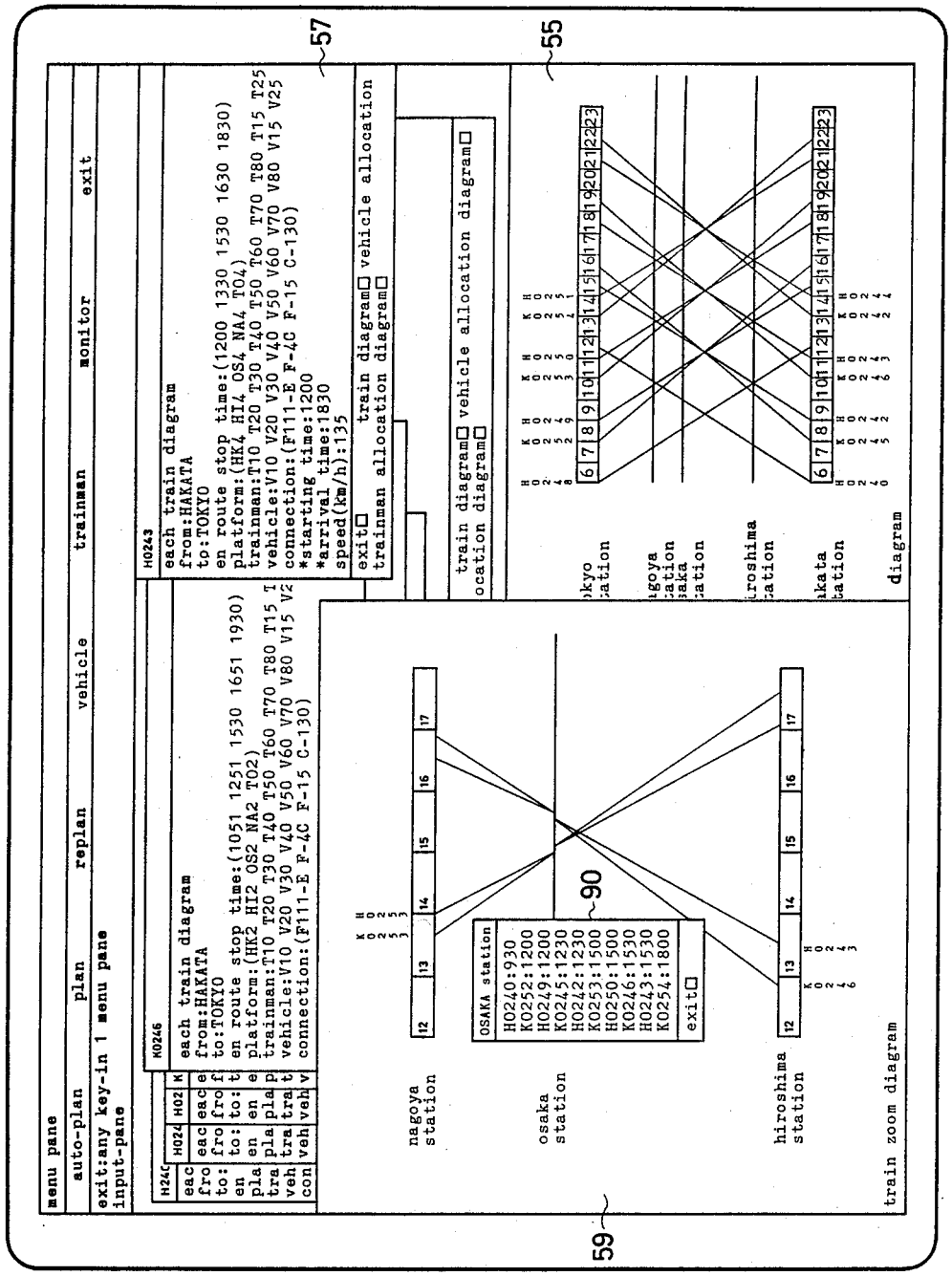

Further expanding the sizes of the zoom window 591 of FIG. 9 as shown in the enlarged diagram 59 in FIG. 10, to change the shape thereof, and transferring the same window 591 to a different position becomes possible by sending expansion and transfer requesting messages to the zoom window 591, which is a branch of the train instruction logic acting unit 163, by the user's operation of the mouse. If the names of stations on these diagrams are pointed by the mouse, a monitoring-requesting message is outputted into a station instruction logic acting unit 166, by which the en route stop time at each of the pointed stations are then displayed in numerical values on the station schedule diagram window 90 which correspond to itself (station instruction logic acting unit 166). If the user carries out message passing through the station instruction logic acting unit 16 and mouse, the contents of this table can, of course, be displayed in rows in the same manner as in a multi-window, in required sizes and shape and in a required position. Moreover, when the table as well as other tables, such as the train schedule table 57 is small, the lateral end is folded back to display the information as a plurality of lines, the table being possible to be scrolled vertically by the mouse and keyboard. If the names of the trains on the all train schedule window 55 and zoom window 59 are selected by the mouse, an en route stop time table 91 (refer to FIG. 11) for the selected train can be displayed. The sizes, position, shape and scrolling of the table are in accordance with the systems of the above station and schedule diagram window.

According to this embodiment, the detailed information on a transit schedule with respect to each train, each station, each vehicle, all vehicles and all trainmen can be can be displayed at once as necessary by various means of expression, such as a table, diagram and sentence in required sizes, shape and color in required positions. Therefore, comparing and generally grasping the information to find errors and designing better schedules can be done easily. This enables a great increase in the reliability and efficiency of the generation and regulation of a transit schedule, which is a complicated judgement business influenced by many logic acting units.

Another embodiment of the present invention will now be described with reference to FIG. 7 downward.

Figure 7:
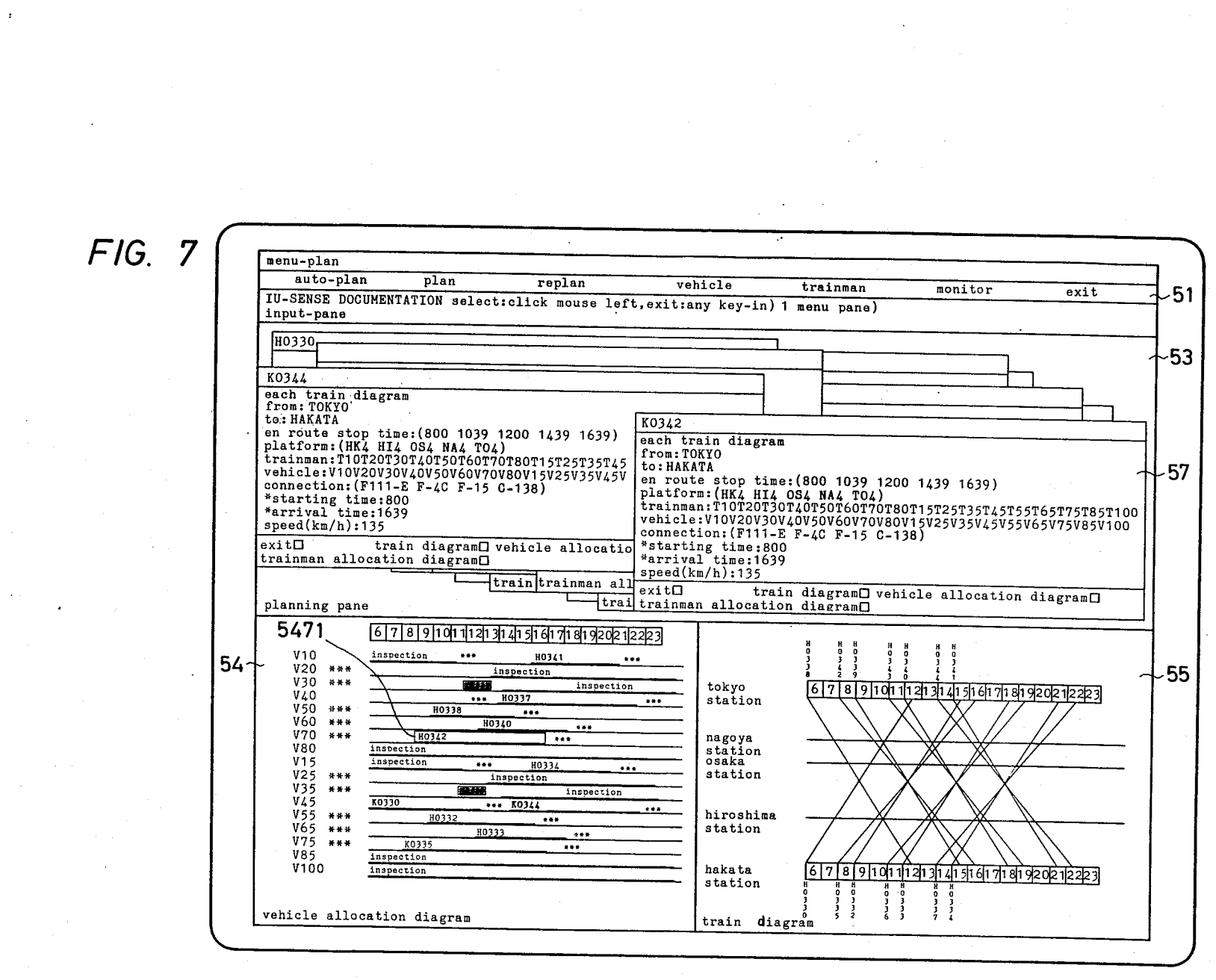

Referring to FIG. 7, "vehicle" in a menu pane 51 is selected by a mouse. When the pointer of the mouse is then transferred to a position near the name of a train H0342, the allocation of which is desired to be changed, in a vehicle allocation window 54 which corresponds to a vehicle instruction logic acting unit 164, a message for requesting the preparation for vehicle allocation change is sent to the vehicle instruction logic acting unit 164, and a rectangular frame 5471, the width of which corresponds to the hours in which a vehicle S70 is allotted to this train is displayed (refer to the vehicle allocation window 54, line 8). When the button on the mouse 4 is pressed during this time, a message for requesting the starting of determination of a vehicle to be allotted to the vehicle instruction logic acting unit 164, and a transfer instruction frame, which has the same sizes as the above-mentioned rectangular frame, and which is drawn with thicker black lines so that this frame can be distinguished from the above-mentioned frame 5471, appears, this transfer instruction frame being moved in accordance with the movement of the mouse. When the transfer instruction frame has transferred to an object place, the button on the mouse is pressed again. Consequently, a message for requesting the completion of determination of the vehicle to be allotted to the vehicle instruction logic acting unit 164, and a vehicle allocation diagram for the train (in this case, H0342) moves to a vehicle allocation-displaying place which corresponds to the place in which the button was pressed. Namely, the vehicle allocation diagram for the train K0342 which appeared correspondingly to S70 in the vehicle allocation diagram of FIG. 7 moves to the position corresponding to S30 in FIG. 8, and disappears from the position corresponding to S70. Different from the case in which an ordinary diagram is moved, the content of the schedule is rewritten at this time so that the vehicle allotted to the train K0342 is changed from S70 to S30.

Different from the way of moving an ordinary picture, a vehicle allocation diagram is moved to and displayed in a predetermined place. Therefore, a train allocation diagram is not moved across the underlines 541, 542 on which the allocation diagrams for the vehicles (in FIG. 8, S10, S20, . . .) are to be displayed.

Figure 8:
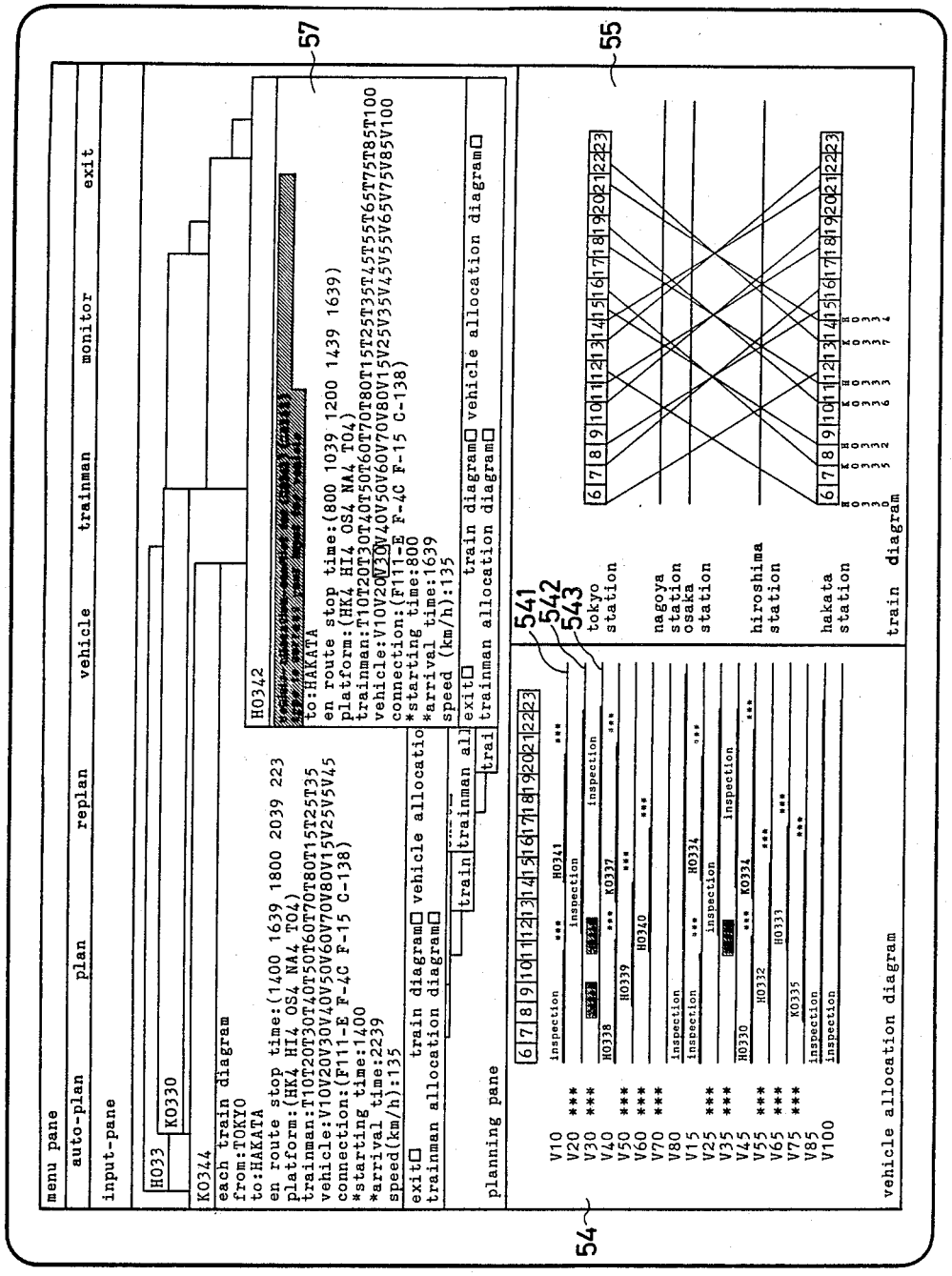

In this embodiment, a vehicle allocation diagram is moved so that the underline on which the allocation diagram for a vehicle X is to be displayed agrees with the lower end of the vehicle allocation diagram for its train if the pointer of the mouse is on the underline on which the allocation diagram for the vehicle X is to be displayed, or between this underline and the underline which is immediately above the same underline. For example, when the button on the mouse 4 is pressed when the pointer thereof is on the underline 543 on which the allocation diagram for the vehicle S30 is to be displayed or between this underline 543 and an underline 542 for the vehicle S20, in an example of transfer of the vehicle allocation diagram for the above train K0342, the vehicle allocation diagram for the train K0342, the vehicle allocation diagram for the train K0342 moves to a position on the underline 543 for S30, as shown in FIG. 8.

When the schedule is corrected by moving the element of a diagram in a vehicle allocation diagram 54, it is often desired that a vehicle to be allotted be changed without changing the allocation time. If the allocation time changes in accordance with the movement of the pointer of the mouse, an inconvenience occurs when it is desired that the allocation time is not changed. The mouse 4 is therefore provided with a plurality of buttons so that, when a predetermined button is pressed, changing an allotted vehicle alone or changing both an allotted vehicle and allocation vehicle and allocation time can be designated.

A mouse 4, which has a single button, or which is incapable of using different buttons for different purposes for certain reasons, should be so designed that, when the button provided thereon is pressed, a menu having the items of changing allotted vehicles, changing the starting time of allocation, changing the time of completion of allocation and cancellation of a change is displayed to enable the user to select one of the items or a combination of a plurality of items and give a necessary instruction. When an instruction for changing time, i.e. an instruction for changing the time of completion of allocation is given, the right portion alone of a transfer instruction frame becomes thick, and the frame moves in accordance with the position of the pointer of the mouse 4. The vehicle allocation time, which corresponds to the position in which the pointer is located when the button on the mouse 4 is pressed, is then set.

When an instruction for changing all of an allotted vehicle, allocation starting time and allocation finishing time is given, the pointer of the mouse changes first into a left parenthesis, a left bracket or a left hook-shaped parenthesis. When the button is pressed with the pointer fixedly positioned, a vehicle to be allotted and allocation starting time are designated. The pointer of the mouse then changes into a right parenthesis, a right bracket or a right hook-shaped parenthesis to enable the allocation finishing time to be designated.

When the mouse 4 is pointed to designate the allocation starting and finishing time, an allocation time table is displayed in a multiwindow-like pattern to accurately indicate the starting and finishing time in numerical values. When such a numerical value is pointed by the mouse 4 to then press the button, the vehicle allocation starting and finishing time can be set accurately from the key board. The resultant vehicle allocation diagram is displayed on a vehicle allocation window 54.

When the "trainman" in the menu pane 51 is selected by the mouse, a trainman allocation diagram 58 is displayed to allot the trainmen in accordance with the content thereof so that the trainmen and allocation time can be changed as necessary.

When "replan" in the menu pane 51 is selected by the mouse, the replanning by directly moving the diagrams and elements in the all train schedule window 55 or zoom window 59 can be done substantially in the same manner as in the case of replanning of vehicles.

Similar replanning can be done by selecting the lower portion of the train schedule diagram 57 (refer to FIG. 8) by the mouse. Namely, the train diagram, vehicle allocation diagram and trainman allocation diagram can be amended by directly moving the diagrams and elements in the all train schedule window 55 and zoom window 59; vehicle allocation window 54; and trainman allocation window, respectively.

Figure 5:
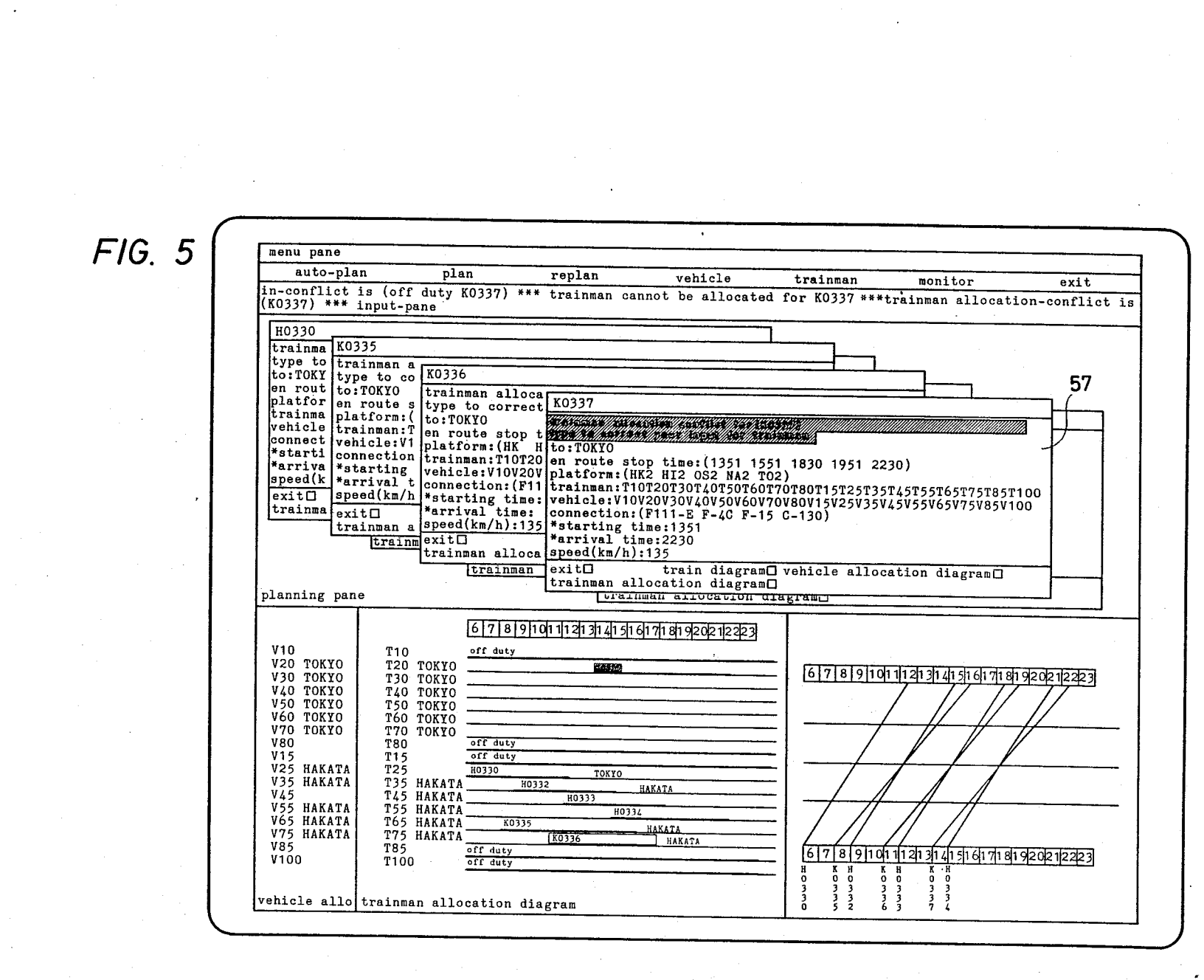

During an automatic or manual transit schedule generating and correcting operation, a direct replanning operation can also be carried out from a window, which was selected by the system 1 after it detected a problem therein and display the same, for example, the trainman allocation diagram 58 in FIG. 5.

The direct schedule setting and changing operations using diagrams, such as the all train schedule window 55 and zoom window 59 can also be carried in the following manner. First, when the name of a train in the window 55 or 59 is selected by the mouse, the travelling line corresponding thereto alone becomes thick and extends from the starting station to the terminus thereof, and this thick travelling line moves in accordance with the movement of the pointer of the mouse. When the object time has come, the button on the mouse 4 is pressed. Consequently, an en route stop time table 91 (refer to FIG. 11) for this time is displayed in multiwindow-like arrangement, and the schedule of the train is changed at this time, the indications in the windows 55, 59 being also changed in accordance with this changed schedule. The en route stop time is changed at the keyboard after a numerical value, which is desired to be changed, on the time table. The en route stop time can also be changed in the following manner. The "diagram" in the lower pane of the en route stop time table 91 is selected by the mouse 4 and the en route stop time which is desired to be changed is designated thereby. As a result, the pointer of the mouse 4 moves to a position which corresponds to the window 55 or 59, and the portion of the travelling line which extends from the station, the en route stop time at which is desired to be changed, forward becomes thick. The thick travelling line moves in accordance with the movement of the pointer of the mouse and the corresponding en route time is displayed on the table 91. The indications in the diagrams in the windows 55, or 59, 591 are also changed.

In this embodiment, required diagrams and tables among the diagrams and tables on which a transit schedule and various actual information thereon are expressed can be displayed at once as necessary to predetermined sizes and in a predetermined shape in a predetermined position. A transit schedule can be corrected and generated accurately by discussing a draft of a transit schedule while looking at a diagram which is suitable for the intuitive and general understanding of the schedule, checking the portion of the schedule which requires to be changed, to directly designate a portion of the diagram by the mouse and move the same portion, changing the shape of a diagram, and reflecting the results of correction based on the general and intuitive discussion in the schedule table to display the results of correction at once thereon. A mouse is used instead of a light pen, the low handling efficiency of which has heretofore called in question, and the values of the items (corresponding to the slots in the object or frame) on the table are changed from the keyboard when inputting numerical values. This enables a numerical value inputting operation to be carried out accurately and simply as compared with a similar operation using a light pen.

Still another embodiment of the present invention will now be described.

Figure 6:
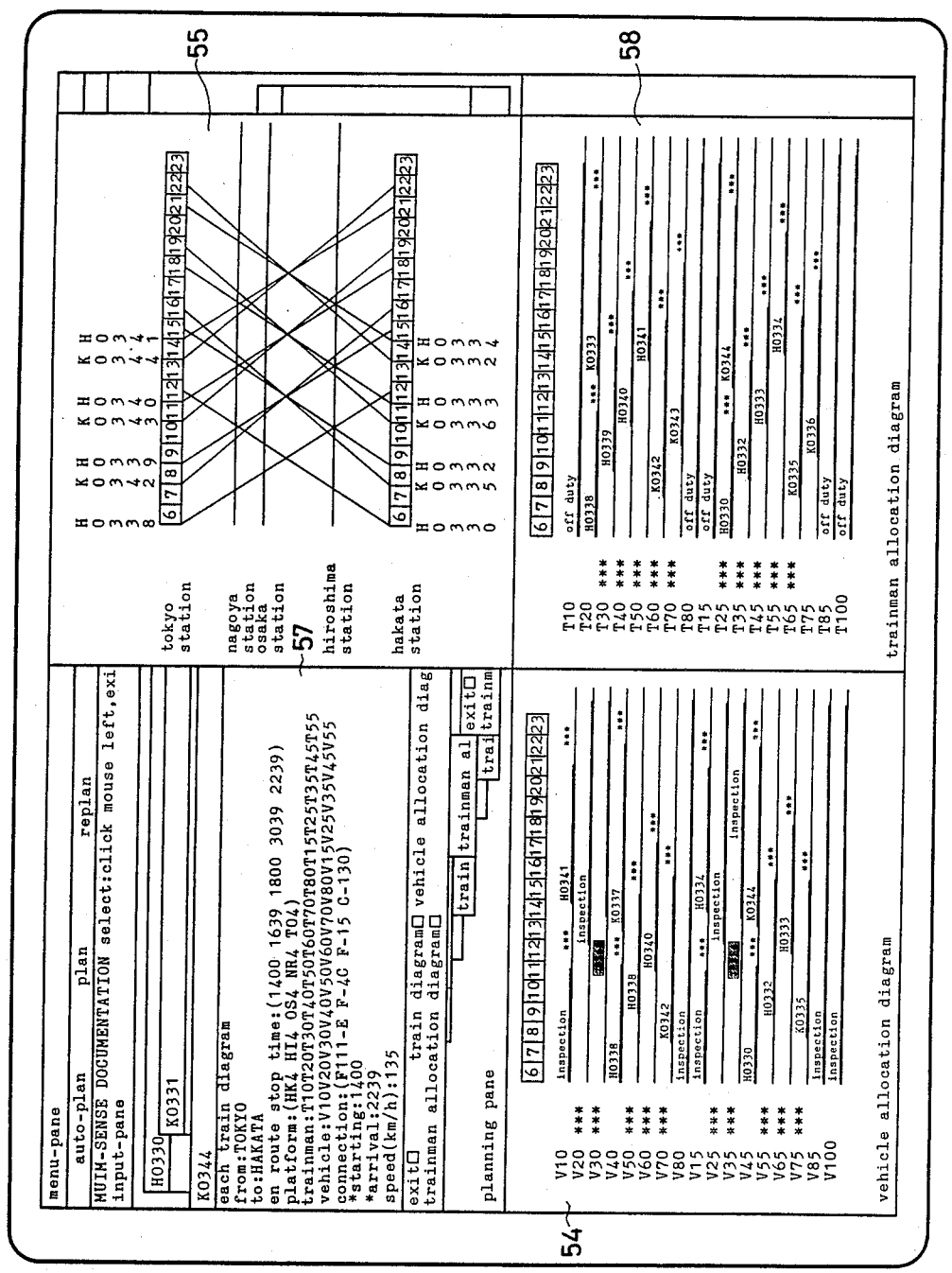
FIG. 6 shows a picture in which a schedule table, a schedule diagram and vehicle and trainman allocation diagram are displayed simultaneously, i.e., in rows.

Referring to FIG. 6, when the outpacing of a train and the allocation of vehicles and trainmen are generally checked with reference to the train schedule window 55, vehicle allocation diagram 54 and trainman allocation diagram 58, it can be understood intuitively from these diagrams that the outpacing of a train and the trainman allocation do not include any errors since the diagrams are highlighted with the light and shade not in reverse. Therefore, the trainman allocation window 58 is put out, and the all train schedule window 55 is moved down to display it on the right side of the vehicle allocation window 54. During an operation for eliminating a contradiction in the highlighted vehicle allocation, the diagram is displayed in this manner so that a contradiction in the outpacing of a train, which is apt to occur if the departure and arrival time of a train are changed, can also be checked and eliminated conveniently.

Looking at both of these diagrams, the solving of a contradiction by replacing a train "K0343" which is concurrent with "KENSA" by the same type of precedent train (the name of which starts with "K") "K0342" is considered (refer to FIG. 7).

In order to correct the schedule from the vehicle allocation window 54 (refer to FIG. 7), "vehicle" in a menu pane 51 is selected by the mouse 4, and the pointer thereof is then moved to a position near the name of a train, the allocation of which is desired to be changed, in the vehicle allocation window 54. As a result, the name of the train and an area, which corresponds to the time to which the train is allotted, are enclosed with rectangular frames as shown in FIG. 7. When the button on the mouse 4 is then pressed, the schedule table for the train is selected and displayed at the foremost side of the planning pane to enable the schedule correction to be done from this schedule table 57. In this embodiment, the value of a vehicle to be allotted is included in a menu as shown in the diagram 57, line 7. If any of the values is selected by the mouse 4, the allotted are displayed in Gothic letters (thick letters) as the values of "vehicle" ("S30" in FIG. 7 and "S30" in FIG. 8, both of which are shown in the primary pane of the train schedule diagram 57, line 7). During this time, the indication of allocation with respect to "K0342" in the vehicle allocation window 54 is transferred from the position (FIG. 7) of S70 to the position (FIG. 8) of S30 so that this indication is consistent with that this indication is consistent with that of the change of content of the schedule (in this embodiment, the change of the vehicle allotted for the train "K0432" of "S70" to "S30". If an error is found during the monitoring of the results of correction, a warning is given thereto by highlighting the same, and its causes are explained, a correction input being then requested (the portion of the window 57 in FIG. 8 in which the light and shade are represented in reverse).

When "trainman" in the menu pane 51 is selected by the mouse 4 to point out by the mouse 4 a position near the name of the train which is desired to be allocation changed while observing the condition of trainman allocation displayed in the trainman allocation diagram 58 (refer to FIGS. 5 and 6), a rectangular frame appears, which encloses the name of the train, in the same manner as in the case of the vehicle allocation window 54. When the button on the mouse 4 is then pressed, the schedule table 57 for the train is selected, so that changing the allocation of the trainmen to the train from the train schedule table 57 becomes possible. The results of this allocation change are displayed on a window with which the train schedule table 57 and trainman allocation window are associated.

The operation of a trainman dispatch instruction logic acting unit will now be described.

Figure 16:
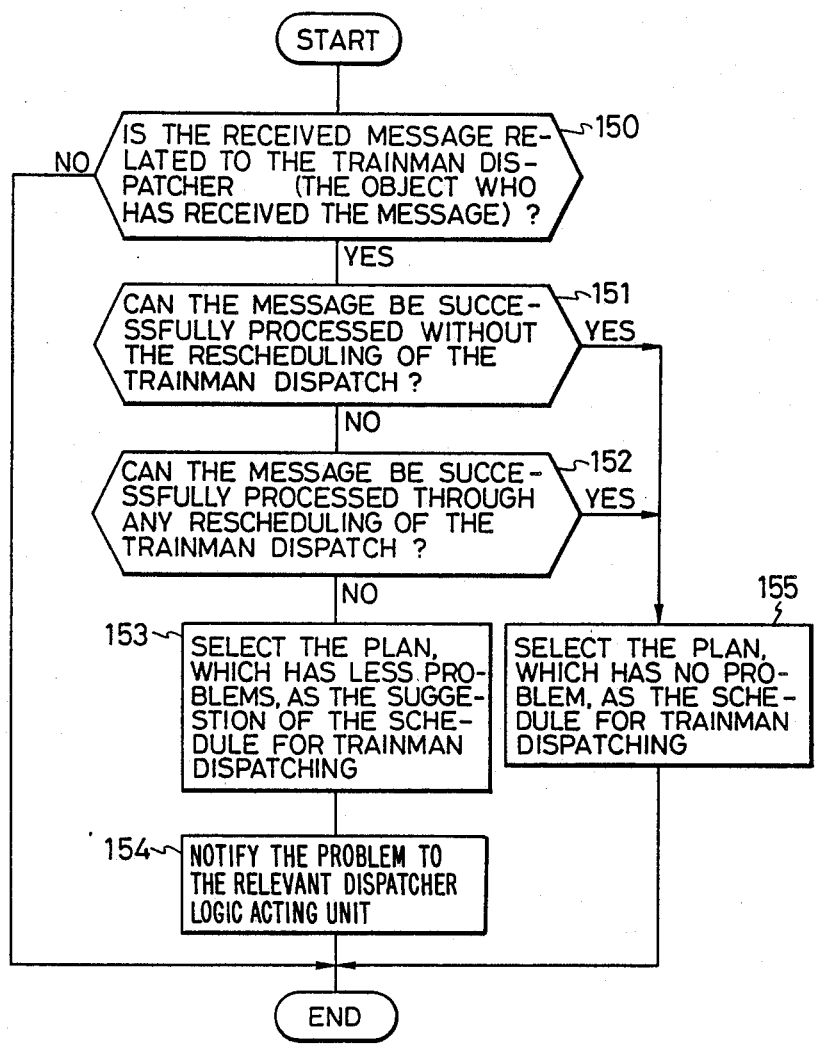

FIG. 16 is a processing flow chart showing an example of a trainman dispatch instruction logic acting unit. The processing operation in the block 132 in FIG. 14 will be taken as an example.

A message sent from the demon or some other logic acting unit is checked (block 150) as to whether it has connection with the trainman dispatch. If it is a message having connection with the trainman dispatch, the message is checked (block 151) as to whether it can be dealt with by adding only what is designated in the message to the actual trainman schedule to thereby change the same schedule. If the message can be dealt with by such a measure, it is used as the best measure to set the trainman schedule (block 155). If the message cannot be dealt with by such a measure, the message is checked (block 152) as to whether it can be dealt with by correcting more portion (unlike a logic acting unit in a conventional system of this kind, a logic acting unit in the present invention is not capable of directly changing an object which is managed by another logic acting unit, and, therefore, the whole of the trainman schedule at most) of the trainman schedule. If the message can be dealt with by this measure, this kind of measure having the smallest number of correction items is used as the best measure to set the trainman schedule (block 155). If the message cannot be dealt with such a measure, a measure having a comparatively small number of problems, i.e. a measure of a slightly-strained principle having a considerably high adaptability is used as the second best measure to form a new trainman schedule (block 153), and the problems are reported (block 154) to the relevant instruction logic acting unit.

When "replan" in the menu pane 51 is selected by the mouse 4 to display the all train schedule window 55 (refer to, for example, FIG. 7), or a part enlarged of the same window 55, the schedule correcting and generating operations can be carried out with reference to the train schedule table 57 in the same way as in the case of the vehicle and trainman allocation windows 54, 58 even if the name of a train on the schedule window 90 therein) is selected. The results of the schedule correcting and generating operations are displayed in the relative windows. When the name of a station is selected instead of the name of a train diagram in the all train 55 and schedule zoom window 59, the station schedule window 90 for the corresponding station appears, and the en route stop time of a train with respect to the same station is displayed with the name of the train (on the left side of the colon). Changing this en route stop time enables the correction of the schedule. The results of the correction are displayed in the relative windows, such as the train schedule table 57, all train schedule window 55 and schedule zoom window 59.

When a problem relating to the generation and correction of a transit schedule occurs during a transit schedule generating and correcting operation, the above-mentioned vehicle allocation window 54, trainman allocation diagram 58 and all train schedule window 55 are selected automatically, and a schedule correcting operation from these windows is started. For example, FIG. 5 shows the condition in which the system 1 detects the occurrence of a problem in the trainman allocation during an automatic schedule generating operation to display the trainman allocation window 58 and enable a schedule correcting operation from this window to be started. During an automatic schedule generating operation and a user's designating operation, the automatic correction of inconsistency within a predetermined range and a procedure of allocation algorithm containing few inconveniences are carried out.

The lower pane in the train schedule table 57 is selected by the mouse 4 to start a schedule correcting operation from the all train schedule window 55 when "train diagram" was selected, from the vehicle allocation window 54 when "vehicle allocation diagram" was selected, and from the trainman allocation window 58 when "trainman allocation diagram" was selected.

In this embodiment, a schedule is studied as a plurality of directly-observable, general diagrams, which are displayed at once in required shapes and sizes in required positions at required time, are observed, and the portions of the schedule which require to be changed are checked. When changing such portions, the relative tables are taken out and the symbols and numerical values therein are changed to reflect the results of correction in the diagrams. Correction errors are automatically detected, and a warning is given. The relative diagrams are displayed together to enable the collectively proper correction and generation of a transit schedule.

According to the present invention described above, it is possible to generate a transit schedule, change a transit schedule when a delay occurs due to an accident or some other cause, i.e., regulate a transit schedule, with a high efficiency and a high reliability, and provide a man-machine interface required to carry out these operations.

We claim:

1. A transit schedule generating method in a computer system having a plurality of objects, comprising:
   a first step of generating by a first logic acting unit a first schedule, through setting at least one of time and route for transportation, on the basis of a first active knowledge modeled for said first logic acting unit and having at least a train dispatching rule for specifying allowable ranges of a train starting time at a station;
   a second step of deciding an information, related to said setting and a relevant logic acting unit, by an object watching said schedule on the basis of a first passive knowledge related to said first schedule and including a name of a datum to be monitored, said name of datum including a name including said train starting time;
   a third step of transferring the generated first schedule from said first logic acting unit to said relevant logic unit by a second logic acting unit by way of message passing, so that said second logic acting unit generates a resource schedule on the basis of a second active knowledge, said second active knowledge having rules for available resources and for resource dispatching and said second active knowledge can be locally accessed by said second logic acting unit for revising said first schedule; and
   a fourth step of generating by said second logic acting unit, a resource schedule for allocating transportation resources needed for making said first schedule practicable, on the basis of said generated first schedule and said second active knowledge.

2. A transit schedule generating method according to claim 1, wherein said method further includes:
   a fifth step of transferring, by said second logic acting unit, to said first logic acting unit by way of message passing suggestive information for a problem related to said resource schedule, when said second logic acting unit cannot generate resource schedules needed for said first schedule without problem; and a sixth step of altering said first schedule by said first logic acting unit in accordance with said suggestive information and said first active knowledge.

3. A transit schedule generating method according to claim 2, wherein said method further comprises:
a step of iterating said first to sixth step until a transit schedule comprising an altered first schedule and a needed resource schedule is made or until a specified condition or a maximum of iteration steps of satisfied.

4. A transit schedule generating method according to claim 3, wherein
said step of iterating is controlled by a third logic acting unit, whether said specified condition or said maximum number of iteration steps is satisfied.

5. A transit schedule generating method according to claim 4, wherein said third logic acting unit determines the priority order of said logic acting units for displaying the information held thereby on a display unit.

6. A transit schedule generating method according to claim 4, wherein when changes occur in said transit schedule, the influence thereof is checked by said third logic acting unit and said transit schedule is automatically modified within a prespecified range if there are problems, and information giving guidance for eliminating said problems is displayed at once as necessary, in a multi-window arrangement.

7. A transit schedule generating method according to claim 1, wherein said first active knowledge is modeled for said first logic acting unit to generate schedules and information to send for arguing or controlling arguing with other logic acting units.

8. A transit schedule generating method according to claim 7, wherein said information for arguing has at least one of suggestions, requests and problems about schedules.

9. A transit schedule generating method according to claim 1, wherein each of said logic acting units has a corresponding display window in which information managed by itself is indicated on a display unit.

10. A transit schedule generating method according to claim 9, wherein each window of schedule tables for each of a multiplicity of transportation vehicles, each window of schedule diagrams which allocates a transportation vehicle, places of train departure and arrival, and working schedule diagrams of trainm,eans and other workers, appears on a screen of a display unit at any indicated time in a multi-window arrangement.

11. A transit schedule generating method according to claim 1, wherein each of said logic acting units performs the steps of:
detecting problems concerning the information managed by itself, informing said problems to said relevant logic acting unit and discussing with said relevant logic acting unit to decide whether said relevant logic acting unit can solve said problems by changing only said information managed by itself.

12. A transit schedule generating method according to claim 11, wherein said relevant logic acting units displays the relevant information managed by itself in respective windows of a multi-window display on a display unit.

13. A transit schedule generating method according to claim 1, wherein said first logic acting unit is a train dispatcher logic acting unit, said second logic unit is a trainman dispatcher logic acting unit, and said method further has a passenger service logic acting unit and a chief dispatcher logic acting unit.

14. A transit schedule generating method according to claim 13, wherein said method further comprises:
a vehicle dispatcher logic acting unit and a station manager logic acting unit.

15. A transit schedule generating method according to claim 1, wherein an element in any one of said diagrams to be displayed on a display unit at once in a multi-window-like arrangement is designated by a pointing means and moved with its sizes changed, whereby the generation and edition of a transit schedule are carried out, on the basis of said designation.

16. A transit schedule generating method according to claim 1, wherein said diagrams and tables having a high degree of mutual relativity and compared with another very frequently are simultaneously displayed on a display unit.

17. A transit schedule method according to claim 1, wherein, said resource schedule is a schedule for allocating transportation media.

18. A transit schedule generating method according to claim 17, wherein said method further comprises a step of:
generating resource schedule for allocating all transportation personnel by a fifth logic acting unit.

19. A transit schedule generating method according to claim 1, wherein said resource schedule is a schedule for allocating all transportation personnel.

20. A transit schedule generating method according to claim 1, further comprising:
a step of generating a manual modification request for modifying said generated first schedule;
a step of modifying said generated first schedule in accordance with said modification request; and
a step of notifying said modification to the relevant logic acting unit.

21. A transit schedule generating system having a computer system and at least objects therein and comprising:
a first logic acting unit having means for generating a first schedule through setting at least one of time and route, for transportation on the basis of a first active knowledge modeled for said first logic acting unit, said first active knowledge having at least a train dispatching rule specifying allowable ranges of a train starting time at a station;
means for deciding an information related to said setting and a relevant logic acting unit, by an object watching said schedule on the basis of a first passive knowledge related to said first schedule and including a name of a datum to be monitored, said name of datum including a name including said train starting time;
means for transferring the generated first schedule from said first logic acting unit to said relevant logic acting unit including a second logic acting unit by way of message passing, so that said second logic acting unit generates a resource schedule on the basis of a second active knowledge, said second active knowledge having rules for available resources and for resource dispatching and can be locally accessed by said second logic acting unit for revising said first schedule; and
means in said second logic acting unit for generating a resource schedule for allocating transportation resources needed for making said first schedule practicable, on the basis of said generated first schedule and said second active knowledge.

22. A transit schedule generating system according to claim 21, wherein said system further comprises:

means in said second logic acting unit for transferring to said first logic acting unit by way of message passing, suggestion information for a problem related to said resource schedule, when said second logic acting unit cannot generate resource schedules needed for said first schedule without problems; and means in said first logic acting unit for altering said first schedule in accordance with said suggestive information and said first active knowledge.

23. A transit schedule generating system according to claim 21, wherein said system includes a third logic acting unit having means for watching the object data held by each of said logic acting units, in order to detect changes in said data, and means for sending when changes have been detected.

24. A transit schedule generating system according to claim 21, wherein said system further comprises:

a fourth logic acting unit for regulating the discussion between said logic acting units on the basis of the messages passed by them, to coordinate the actions of said logic acting units.

25. A transit schedule generating method in a computer system having a plurality of objects, comprising:

a first step of generating by a first logic acting unit a first schedule, through setting at least one of time and route for transportation, on the basis of a first active knowledge modeled for said first logic acting unit and having at least a train dispatching rule for specifying allowable ranges of a train starting time at a station;

a second step of deciding an information, related to said setting and a relevant logic acting unit, by an object watching said schedule on the basis of a first passive knowledge related to said first schedule and including a name of a datum to be monitored, said name of datum including a name including said train starting time;

a third step of transferring the generated first schedule from said first logic acting unit to said relevant logic unit by a second logic acting unit by way of message passing, so that said second logic acting unit generates a resource schedule on the basis of a second active knowledge, said second active knowledge having rules for available resources and for resource dispatching and said second active knowledge can be locally accessed by said second logic acting unit for revising said first schedule;

a fourth step of generating by said second logic acting unit, a resource schedule for allocating transportation resources needed for making said first schedule practicable, on the basis of said generated first schedule and said second active knowledge;

a fifth step of transferring by said second logic acting unit to said first logic acting unit by way of message passing a modification request for said resource schedule, when said second logic acting unit cannot generate resource schedules needed for said first schedule without problem;

a sixth step of modifying according to said modification request, said first schedule and said resource schedule on the basis of relaxed constraints in said first and second active knowledge; and a seventh step of fixing said modified first schedule by said first logic acting unit when said modified resource schedule has no problem.

26. A transit schedule generating method according to claim 25, further comprising:

an eight step of a generating, by said first logic acting unit, an alternative first schedule proposition to be checked to said second logic acting unit; and a ninth step of repeating generation of further alternative first schedules to said second logic acting unit when a problem is detected, until said second logic acting unit detects no problem.

27. A transit schedule generating method according to claim 26, further comprising:

a tenth step of sending a coordination request to a chief logic acting unit when said problem is detected in said ninth step;

an eleventh step of generating and sending a coordination proposition message, by said chief acting unit, which is proposed by relaxing constraints within an allowable range; and a twelfth step of generating by said first logic acting unit, further modified first schedule under said coordination proposition message.

28. A logic acting unit in a transit schedule generating system in a computer system having at least objects therein comprising:

means for generating a first schedule through setting at least one of time and route for transportation, on the basis of a first active knowledge modeled for said first logic acting unit and having at least a train dispatching rule specifying allowable ranges of a train starting time at a station;

means for deciding an information related to said setting and a relevant logic acting unit, said means being in an object watching said schedule on the basis of a first passive knowledge related to said first schedule and including a name of a datum to be monitored, said name of said datum which includes a name including said train starting time;

means for transferring the generated first schedule to said relative logic acting unit including another logic acting unit by way of message passing, so that said another logic acting unit generates a resource schedule on the basis of a second active knowledge, said second active knowledge having rules for available resources and for resource dispatching and can be locally accessed by said another logic acting unit for revising said first schedule;

means for estimating the generated first schedule and said resource schedule received from said another logic acting unit, when a resource schedule proposition message is received from another logic acting unit;

means for setting a value to its iteration counter, when a transportation schedule modification message is received from another logic acting unit;

means for generating a modified or completely alternative transportation schedule proposition message to said another logic acting unit or a coordination request message to a chief logic acting unit, when said iteration counter reaches said value;

means for sending a coordination request message, when a time-out problem message is received; and means for relaxing a specific constraint, and generating a modulated first schedule, when a coordination proposition message with said specified constraint is received from another logic acting unit and sending said modulated first schedule with a compromise request to said another logic acting unit.

29. A logic acting unit in a transit schedule generating system in a computer system having at least objects therein and comprising:

means for generating a resource schedule for allocating transportation resources needed for making a first schedule practicable, on the basis of said first schedule and an active knowledge, when a transportation schedule proposition message with said first schedule from another logic acting unit is received, said active knowledge having rules for available resources and for resource dispatching and can be locally accessed by said another logic acting unit for revising said first schedule;

means for generating said logic acting unit for revising said first schedule;

means for generating said resource schedule under a relaxed constraint, when a proposition message with a compromise request is received from said another logic acting unit;

means for generating and sending a transportation modification request to said another logic acting unit for generating the resource schedule without problem, when a problem is detected for generating said resource schedule; and means for sending the generated resource schedule to said another logic acting unit.

* * * * *